Feb. 13, 1945.  J. W. BRYCE  2,369,431
PHOTOGRAPHIC IDENTIFYING MARK RECORDER
Filed May 24, 1940  13 Sheets-Sheet 1
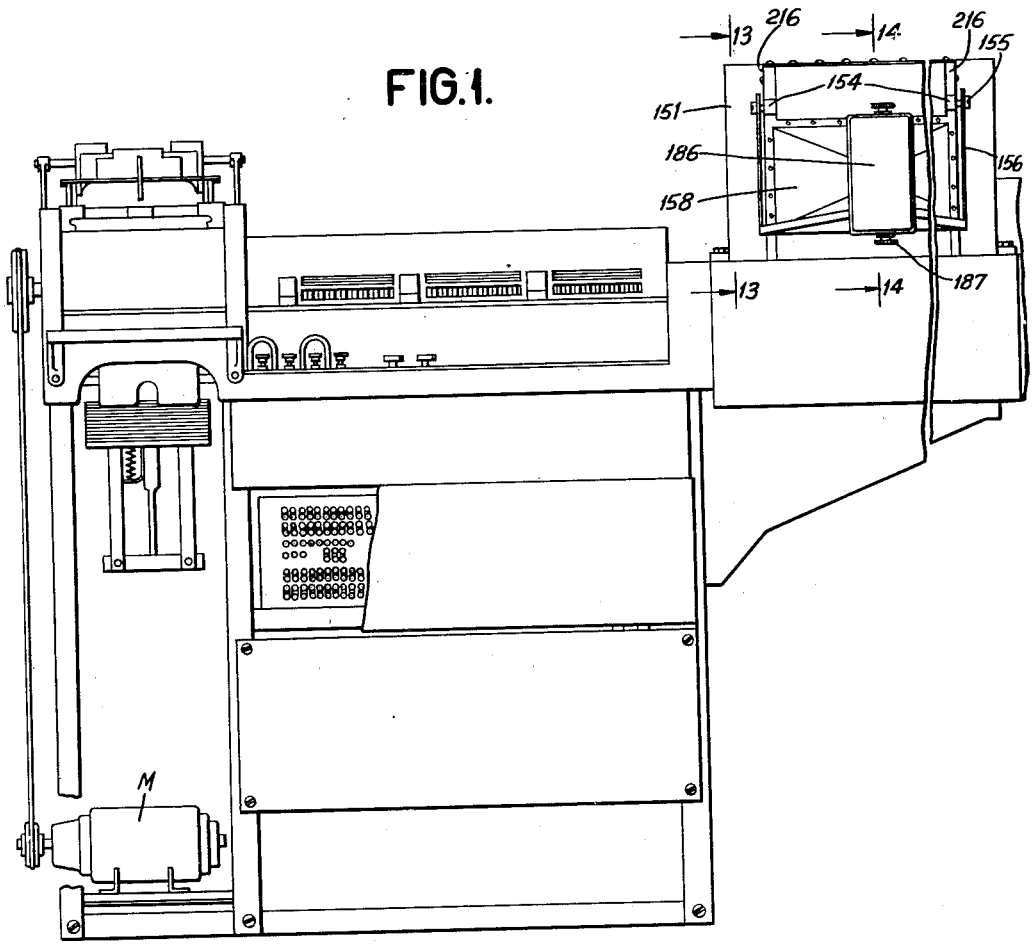
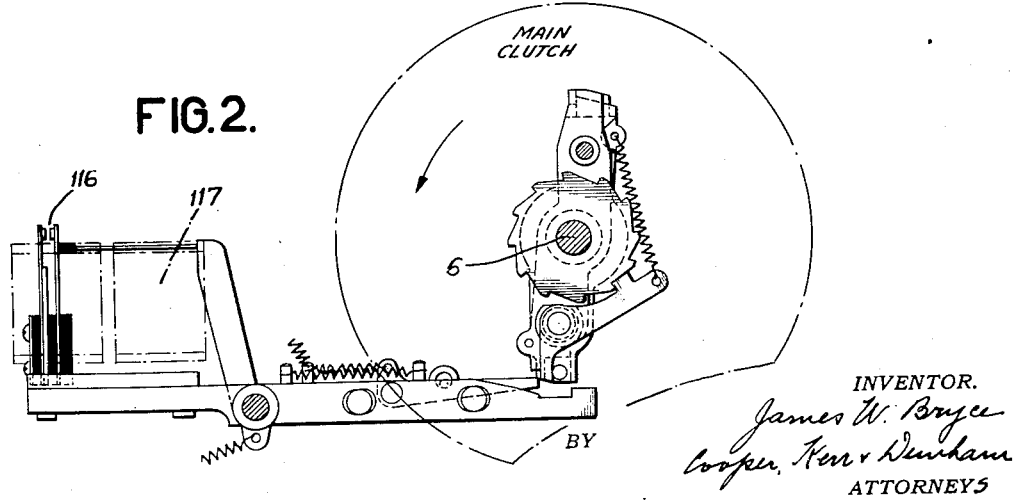
INVENTOR.
James W. Bryce
Cooper, Kerr & Dunham
ATTORNEYS Feb. 13, 1945. J. W. BRYCE 2,369,431
PHOTOGRAPHIC IDENTIFYING MARK RECORDER
Filed May 24, 1940 13 Sheets-Sheet 2
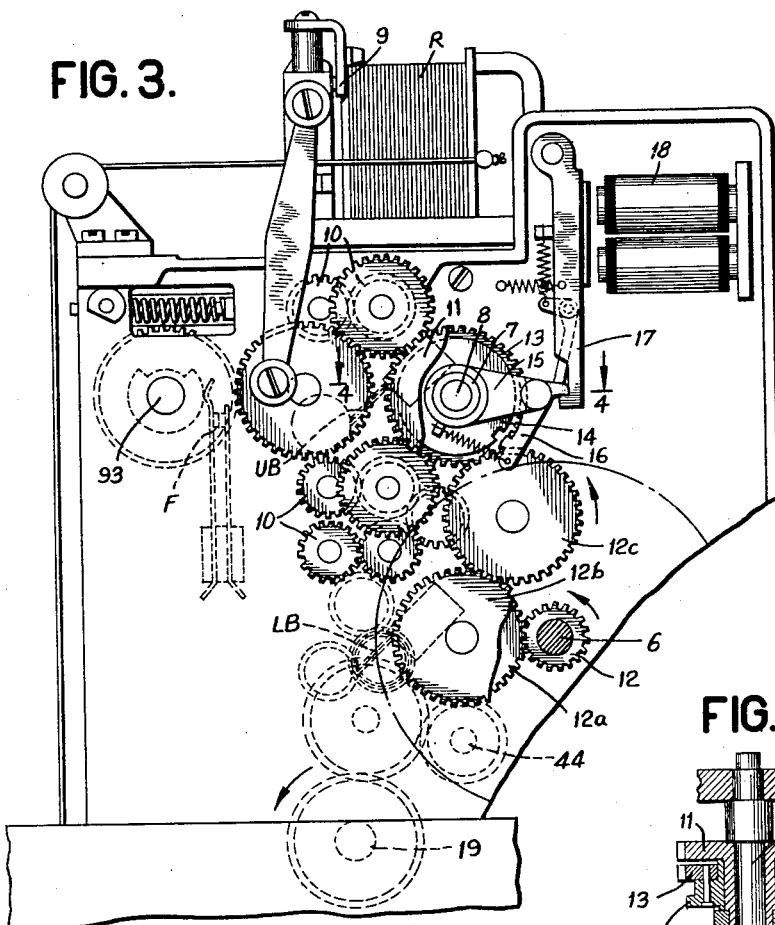
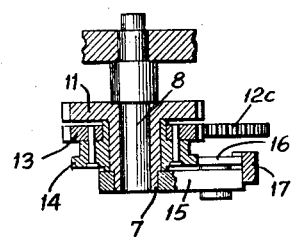
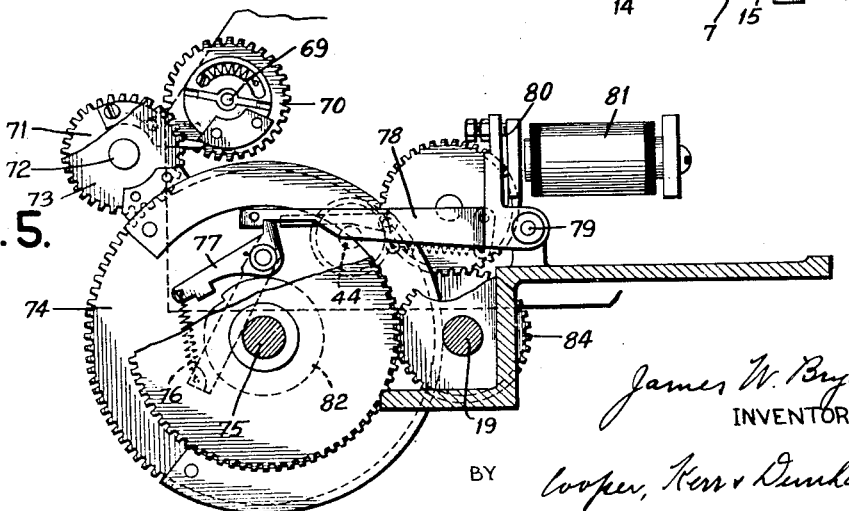

Feb. 13, 1945.  J. W. BRYCE  2,369,431
PHOTOGRAPHIC IDENTIFYING MARK RECORDER
Filed May 24, 1940  13 Sheets-Sheet 3
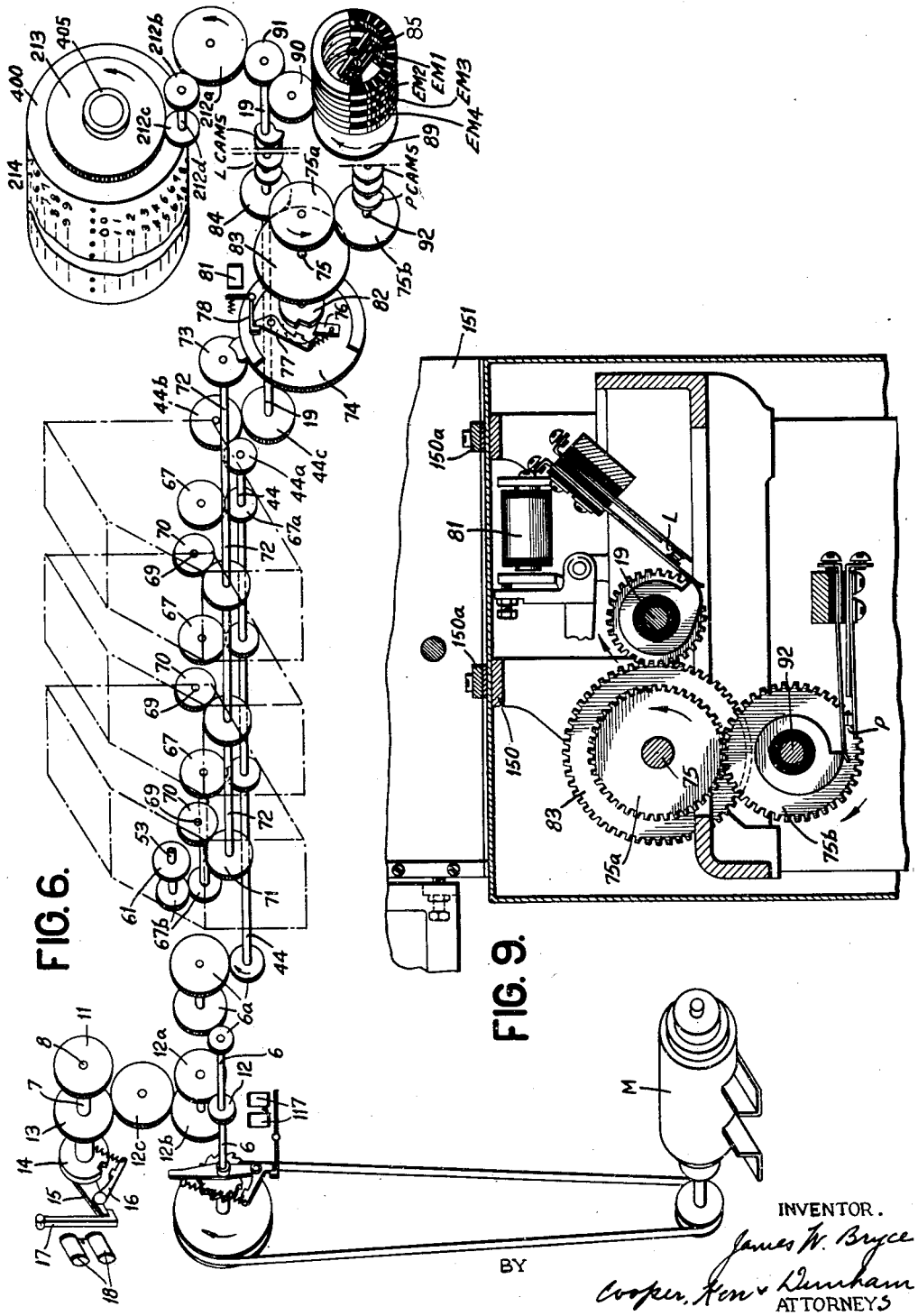

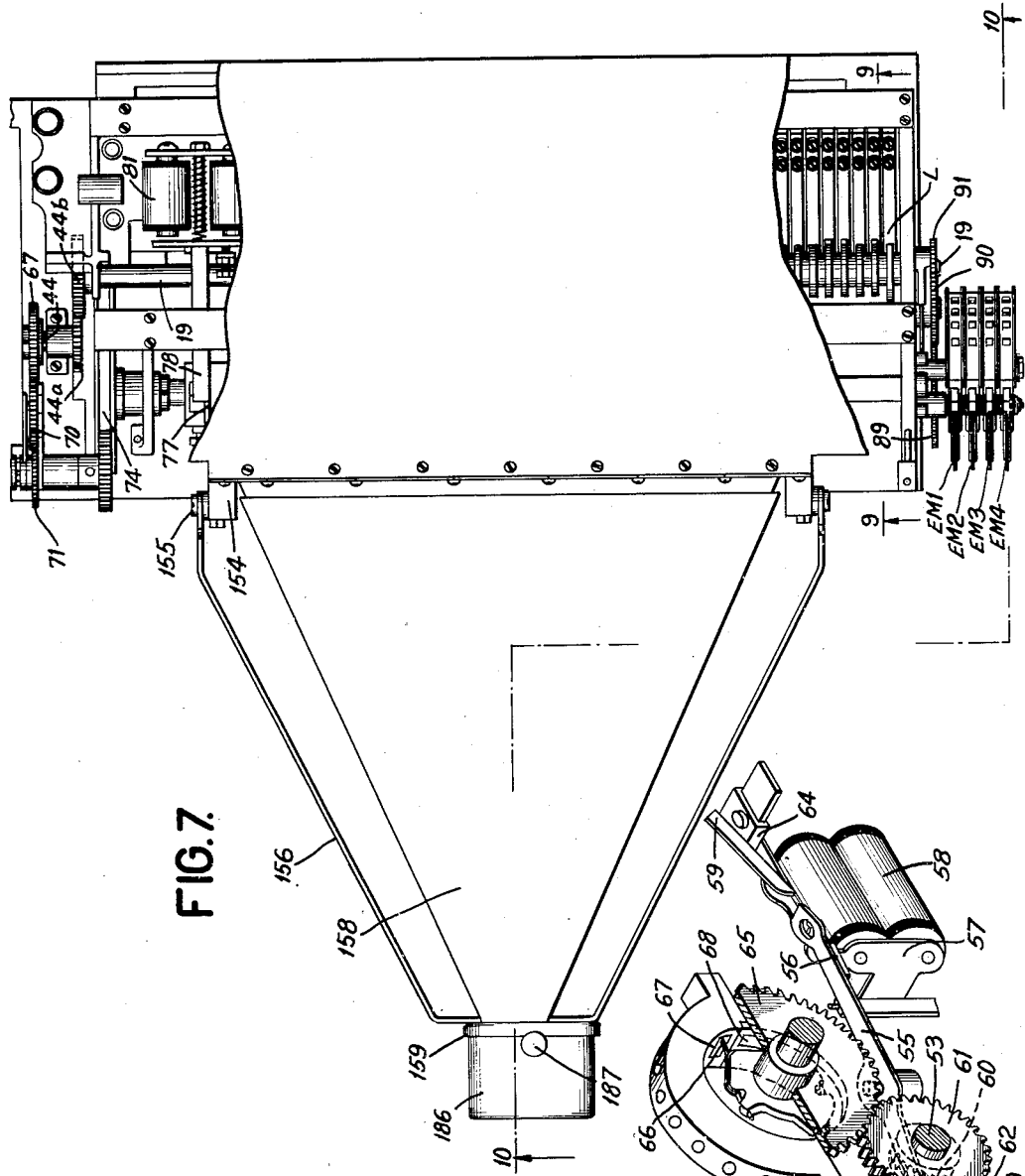

Feb. 13, 1945. J. W. BRYCE 2,369,431
PHOTOGRAPHIC IDENTIFYING MARK RECORDER
Filed May 24, 1940 13 Sheets-Sheet 5
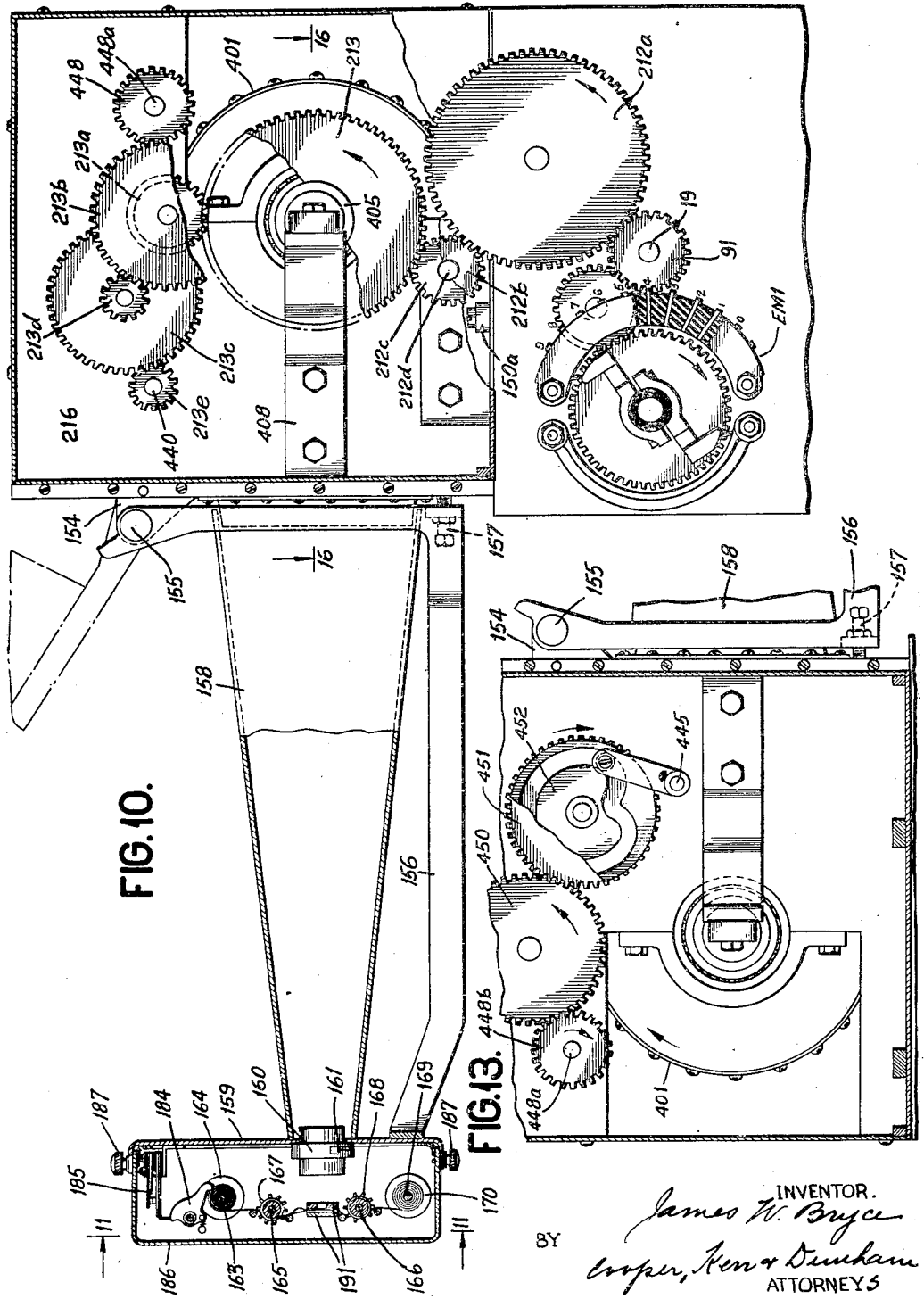
INVENTOR.
James W. Bryce
BY
Cooper, Kerr & Dunham
ATTORNEYS Feb. 13, 1945. J. W. BRYCE 2,369,431
PHOTOGRAPHIC IDENTIFYING MARK RECORDER
Filed May 24, 1940 13 Sheets-Sheet 6
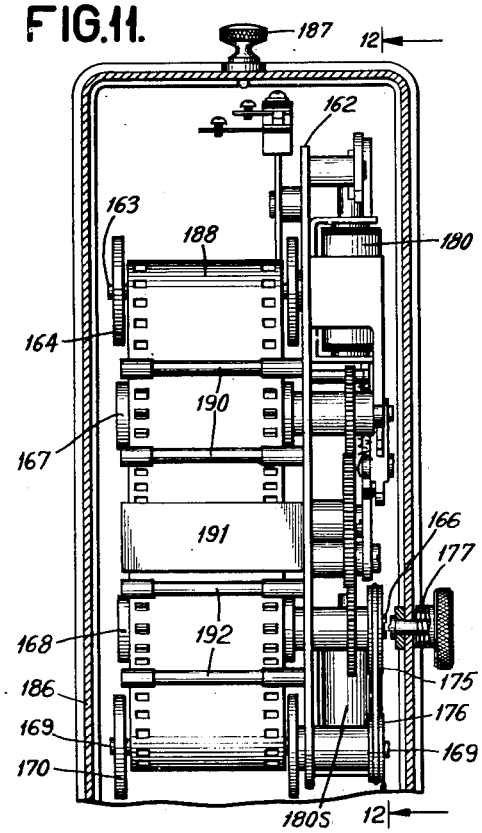
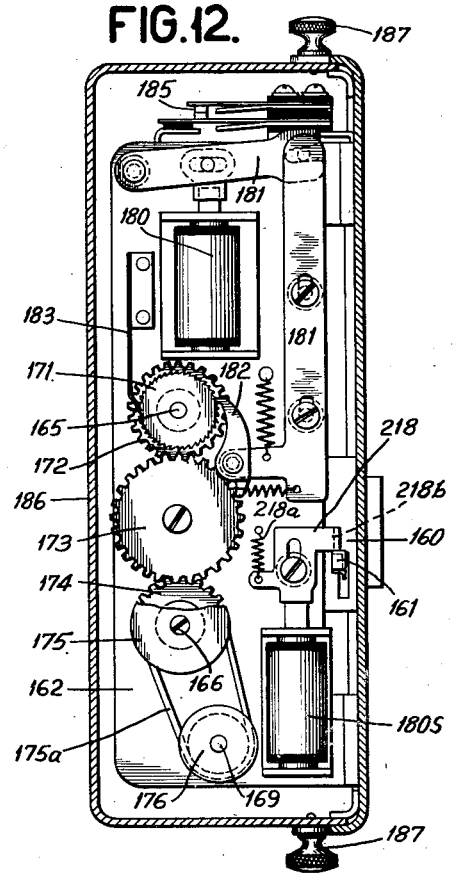
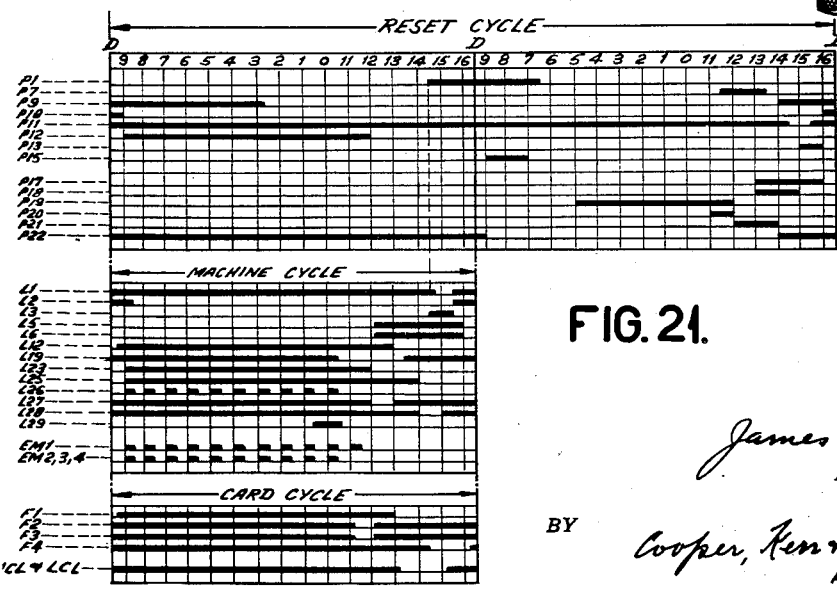
FIG. 21.
James W. Bryce
INVENTOR.
BY Cooper, Kerr & Dunham
ATTORNEYS Feb. 13, 1945. J. W. BRYCE 2,369,431
PHOTOGRAPHIC IDENTIFYING MARK RECORDER
Filed May 24, 1940 13 Sheets-Sheet 7
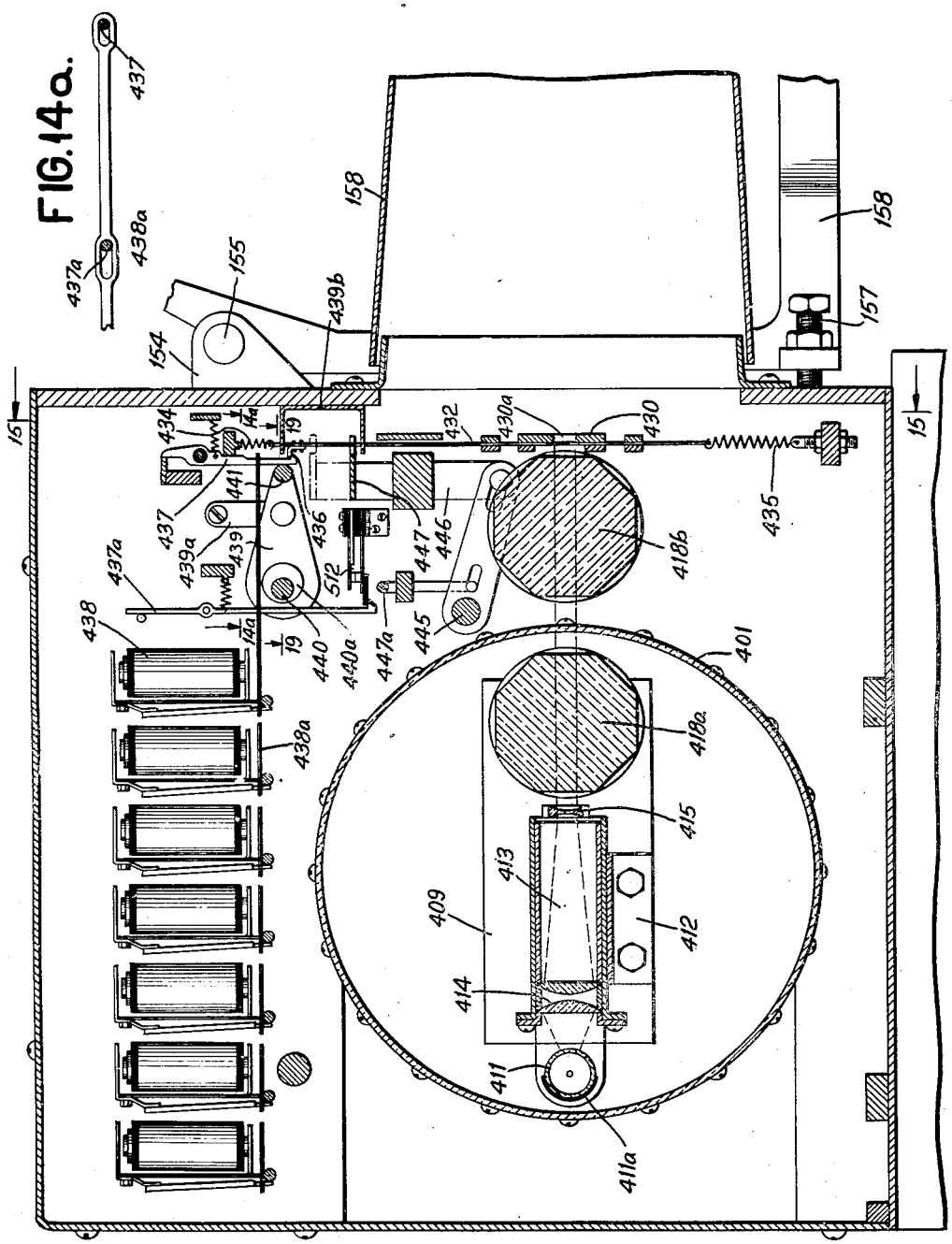
INVENTOR.
James W. Bryce
BY
Cooper, Kerr & Dunham
ATTORNEYS Feb. 13, 1945. J. W. BRYCE 2,369,431
PHOTOGRAPHIC IDENTIFYING MARK RECORDER
Filed May 24, 1940 13 Sheets-Sheet 8

INVENTOR
James W. Bryce
BY W. M. Wilson
ATTORNEY

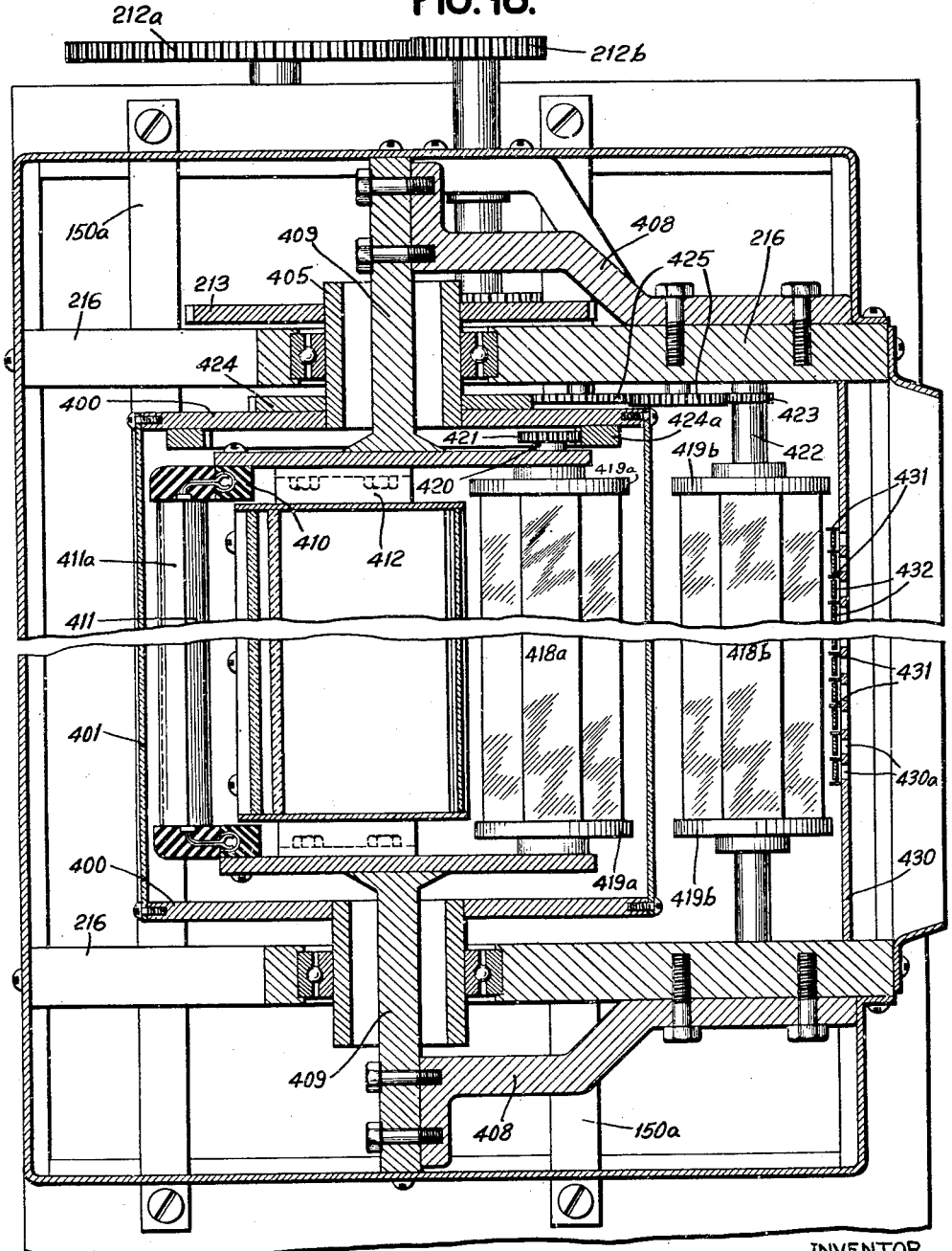

Feb. 13, 1945.    J. W. BRYCE    2,369,431
PHOTOGRAPHIC IDENTIFYING MARK RECORDER
Filed May 24, 1940    13 Sheets-Sheet 10
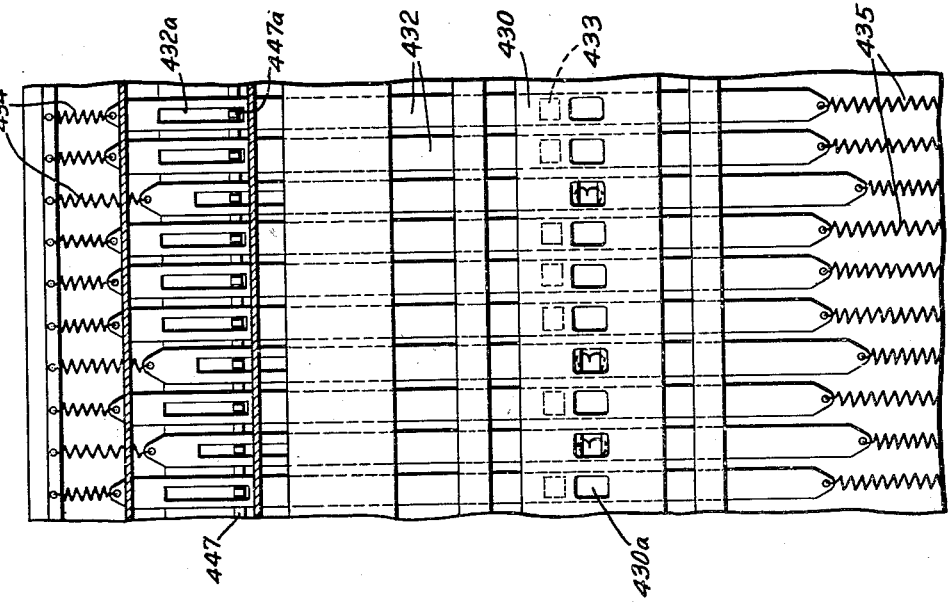
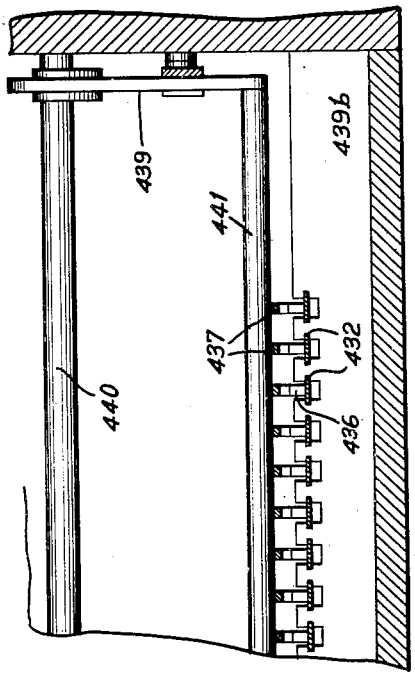
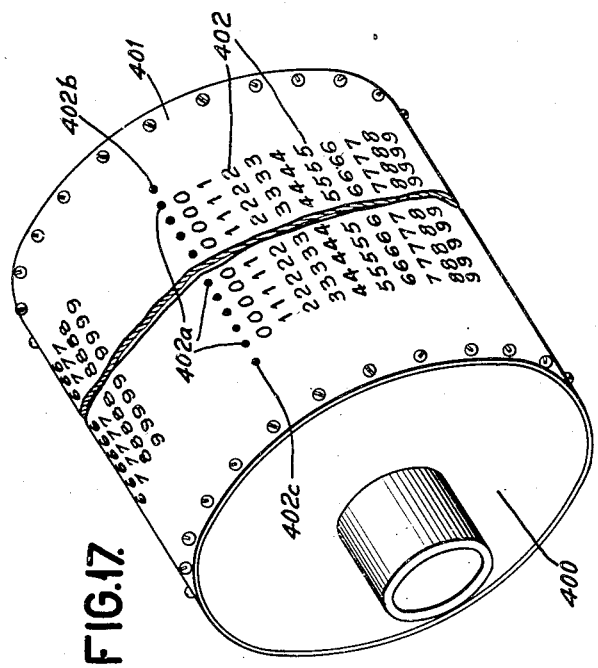
INVENTOR.
James W. Bryce
BY Cooper, Kerr & Dunham
ATTORNEYS

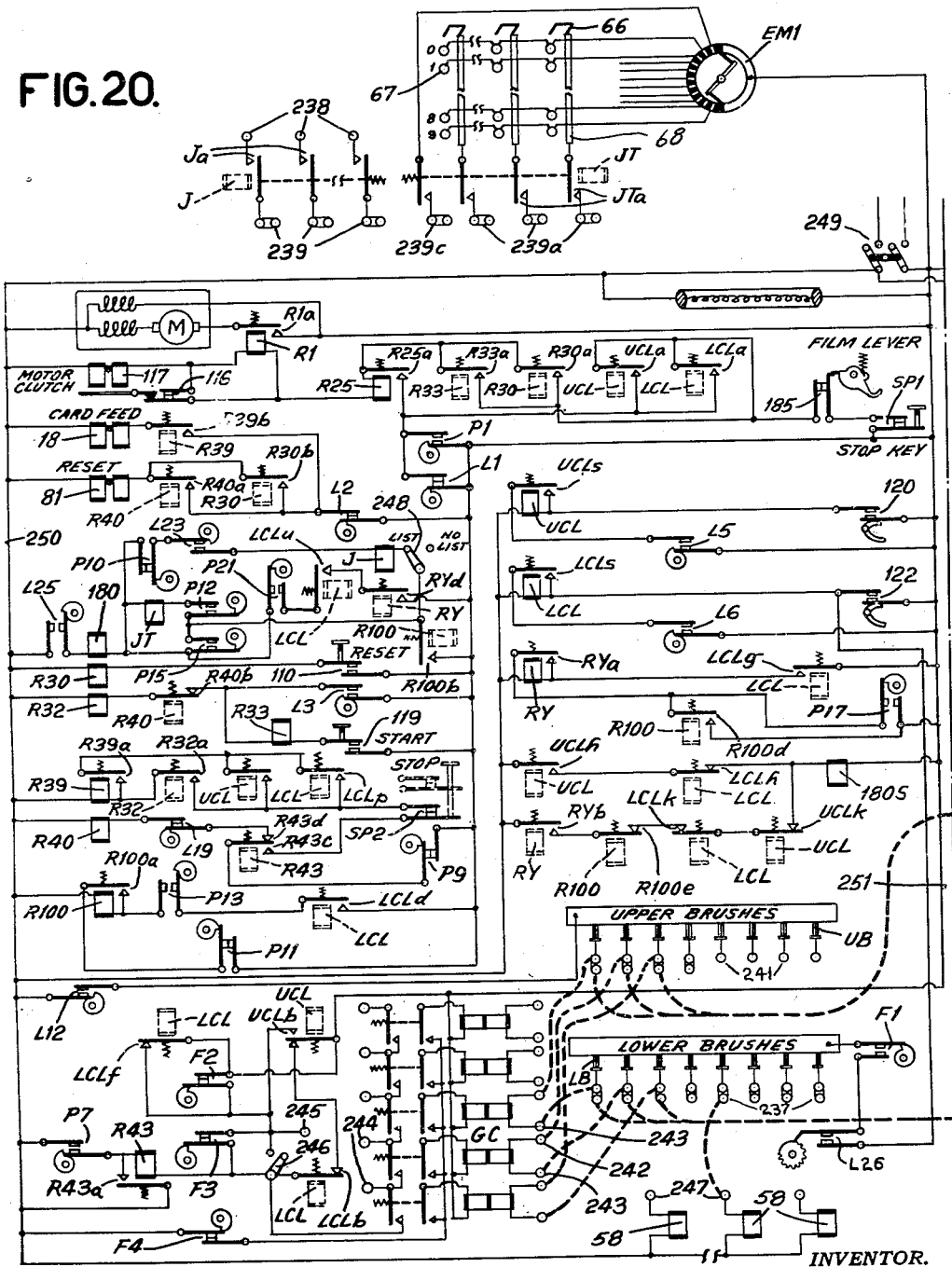

Feb. 13, 1945.  J. W. BRYCE  2,369,431
PHOTOGRAPHIC IDENTIFYING MARK RECORDER
Filed May 24, 1940  13 Sheets-Sheet 12

Feb. 13, 1945. J. W. BRYCE 2,369,431
PHOTOGRAPHIC IDENTIFYING MARK RECORDER
Filed May 24, 1940     13 Sheets-Sheet 13
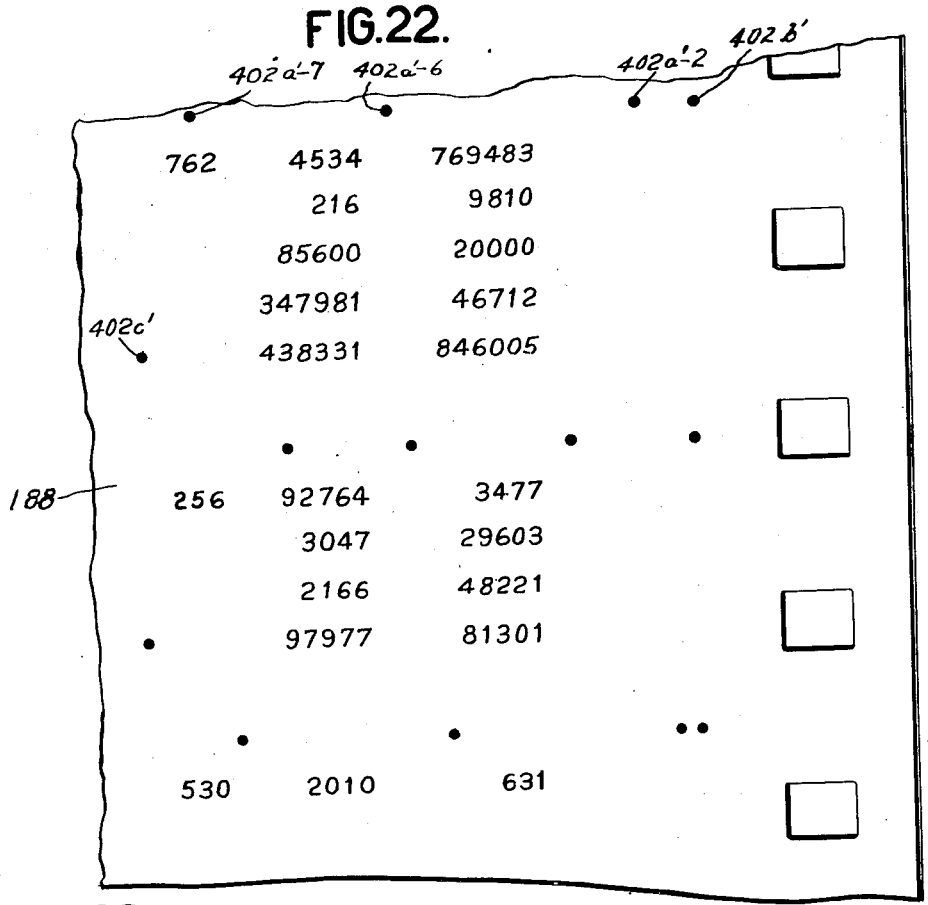
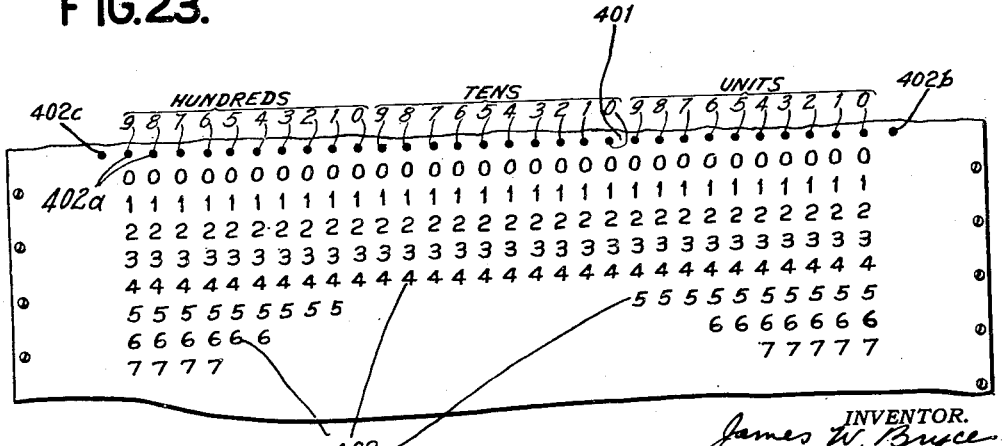

Patented Feb. 13, 1945

2,369,431

UNITED STATES PATENT OFFICE 2,369,431

PHOTOGRAPHIC IDENTIFYING MARK RECORDER

James W. Bryce, Glen Ridge, N. J., assignor to International Business Machines Corporation, New York, N. Y., a corporation of New York Application May 24, 1940, Serial No. 336,934

3 Claims. (Cl. 235—61.6)

This invention is directed to improvements in a photographic recording accounting machine such as disclosed in my copending application Serial No. 321,391, filed February 29, 1940, and now Patent No. 2,343,397, dated September 30, 1943. In the machine therein disclosed, a character bearing element is continuously rotated past a film and under control of data designations on record cards, characters are photographed from the element on the film. The film is line spaced for each card and at the end of the run of a group of cards, the film has exposed thereon a list of items derived from the cards. The machine may be operated to list items unaccompanied by a total or to accumulate certain card items and photographically record their total on the film. Alternatively, the machine may be operated to photographically record totals of card items unaccompanied by the list of items. A plurality of groups of record cards may be run through the machine and data derived from each group photographically recorded on the same film. Thus the roll of film may have a series of successive data records each pertaining to a different card group.

The data pertaining to each card group, as photographed on the film, may be referred to as the group record. It is desirable to identify each group record. Ordinarily, each card group has a common identification, designated on at least one of its cards. The number of cards in a group may vary and hence the listing of items from cards of different groups will result in the film having a series of group records of varying length. Thus a one card group may result in a group record on the film of only a single line whereas a plural card group will result in a plural line group record, the last line of which may be a detail item or possibly a total should the machine be operated for listing and totaling.

The machine thus far described is shown in my copending application and has no provision for identifying the different group records on the film. Such identification is desirable in order that after a roll of film has been prepared, a desired group record may be singled out for inspection.

In my Patent No. 2,124,906, each of successive records on a film is identified by code spots in columns disposed lengthwise of the film. The successive records on that film are of equal length and the code spots lie alongside of the data record such as a pictorial representation of a document. These code spots are adapted to be read out by differentially timed cyclical means to bring a desired record to viewing position. The lengthwise disposition of code marks for controlling the differentially timed means is suitable for even frame spacing with a single data record on each frame. However, in the present case, the indications are to be photographed from a moving element on a film at rest. To photograph the code indications lengthwise of the film in differentially significant positions from a moving element would involve an extremely complex structure and plan of operation. Further, the lengthwise differential disposition of code indications would occupy too great a linear distance along the length of the film and would unduly increase the total length of the film required for a given amount of data. This is particularly the case when there are a number of group records, each of which may consist of but one or a few lines.

The general object of the present invention is to provide novel means for solving the aforementioned difficulties in a manner which will permit of simplicity of construction and operation in a machine for photographically recording differently significant code or control spots on a film.

More specifically, one object of the invention is to provide means for photographically recording control spots or marks in differentially significant positions transversely or laterally across the film. This affords compactness for the code number zone on the film and obtains compactness in the direction of length or movement of the film. The compactness of the coded record is obtained by disposing the control marks across the film in differently significant lateral positions so that their value can be ascertained solely according to their position, irrespective of the fact that the code marks or spots may be of identical size or configuration.

Further, another object is to provide a character bearing element; specifically, a continuously rotating drum, with a transverse line or row of control marks which may be selectively exposed and photographed across the film to afford a coded control designation.

Still further, another object is to provide for the concurrent photographic recording of selected control marks in differential positions across the width of the film and so that the significance of the marks will depend solely on their lateral positional relation.

It is a further object of the invention to provide for the photographing of the control marks laterally across the film in multi-position zones corresponding to different denominational orders of values.

Another object of the invention is to provide means for photographically recording positionally differentiated control marks on the film in conjunction with the differentially timed photographing of different characters.

Specifically, a further object of the invention is to provide means for photographically recording control spots or marks across a line of a film in differentially significant positions to represent a group number and to provide such photographic representation for each group record on the film.

Further, another object of the invention is to provide means for photographically recording the group identifying code at the beginning of the group record on the film to classify all the items of the group, as well as the last line of the group, whether such last line be a detail item or a group total.

The group identification is derived from a record card which has perforations representing such identification. These perforations are differentially positioned on the card and read out as differentially timed equivalent representations. On the other hand, the control spots representing the group identification are photographically read out from the indication-bearing drum onto the film at one time and differentiated by their positional representation.

It may be stated then, that another object of the invention is to provide means for converting the differentially timed representations derived from the record into singly or concurrently timed photographic exposures of equivalent representations from an indication-bearing element.

Still another object is to provide means for differentiating, by means of aligning or master control spots, the beginning of a group record from the end of the group record on the film. This provides means whereby, in a film viewing machine, either the beginning or end of a selected group record bearing a single identifying code may be automatically brought to viewing position. Such means is particularly desirable when the group record has a great number of lines and when it may be desired to examine only a particular line of a group record.

A film viewing machine for bringing to a viewing station selected group records bearing the code spots on the film prepared by the machine according to the present invention is disclosed in my copending application, Serial No. 342,641, filed on June 27, 1940 and now Patent No. 2,323,-372, dated July 6, 1943.

Other objects of the invention will be pointed out in the following description and claims and illustrated in the accompanying drawings, which disclose, by way of example, the principle of the invention and the best mode, which has been contemplated, of applying that principle.

In the drawings:

Figure 1 is a front elevational view of the machine;

Fig. 2 is a detail view of the main clutch of the machine;

Fig. 3 is a side elevational view of the card feeding and analyzing mechanism. This view also shows the card feed clutch device;

Fig. 4 is a detail sectional view taken on line 4—4 of Fig. 3;

Fig. 5 is a detail view of the accumulator reset mechanism and the clutch therefor;

Fig. 6 is a somewhat diagrammatic view of the drive mechanism of the machine;

Fig. 7 is a top view of the recording section of the apparatus with certain cover parts broken away to show the interior construction;

Fig. 8 is an isometric view of certain elements of one denominational order of one of the accumulators;

Fig. 9 is a detail view taken on line 9—9 of Fig. 7 showing driving mechanism and cam contact devices;

Fig. 10 is a partly end elevational view and partly sectional view of the recording apparatus, the view being taken substantially on line 10—10 of Fig. 7;

Fig. 11 is a sectional view of the photographic recording apparatus. This view is taken substantially on line 11—11 of Fig. 10;

Fig. 12 is a detail sectional view of this apparatus, the section being taken substantially on line 12—12 of Fig. 11;

Fig. 13 is a sectional view taken substantially along the line 13—13 of Fig. 1;

Fig. 14 is a detail sectional view taken on line 14—14 of Fig. 1. This view shows the recording drum in section.

Fig. 14a is a detail view of a pull rod as viewed along line 14a—14a of Fig. 14;

Fig. 16 is a detail sectional view taken on line 16—16 of Fig. 10, showing the recording drum and optical system;

Fig. 17 is an isometric detail view of the character drum;

Fig. 18 is a detail view of a portion of Fig. 15 showing the shutter mechanism in displaced position (i. e. in mid-position);

Fig. 19 is a detail sectional view taken on line 19—19 of Fig. 14 and showing other details of the shutter mechanism;

Figure 20A:
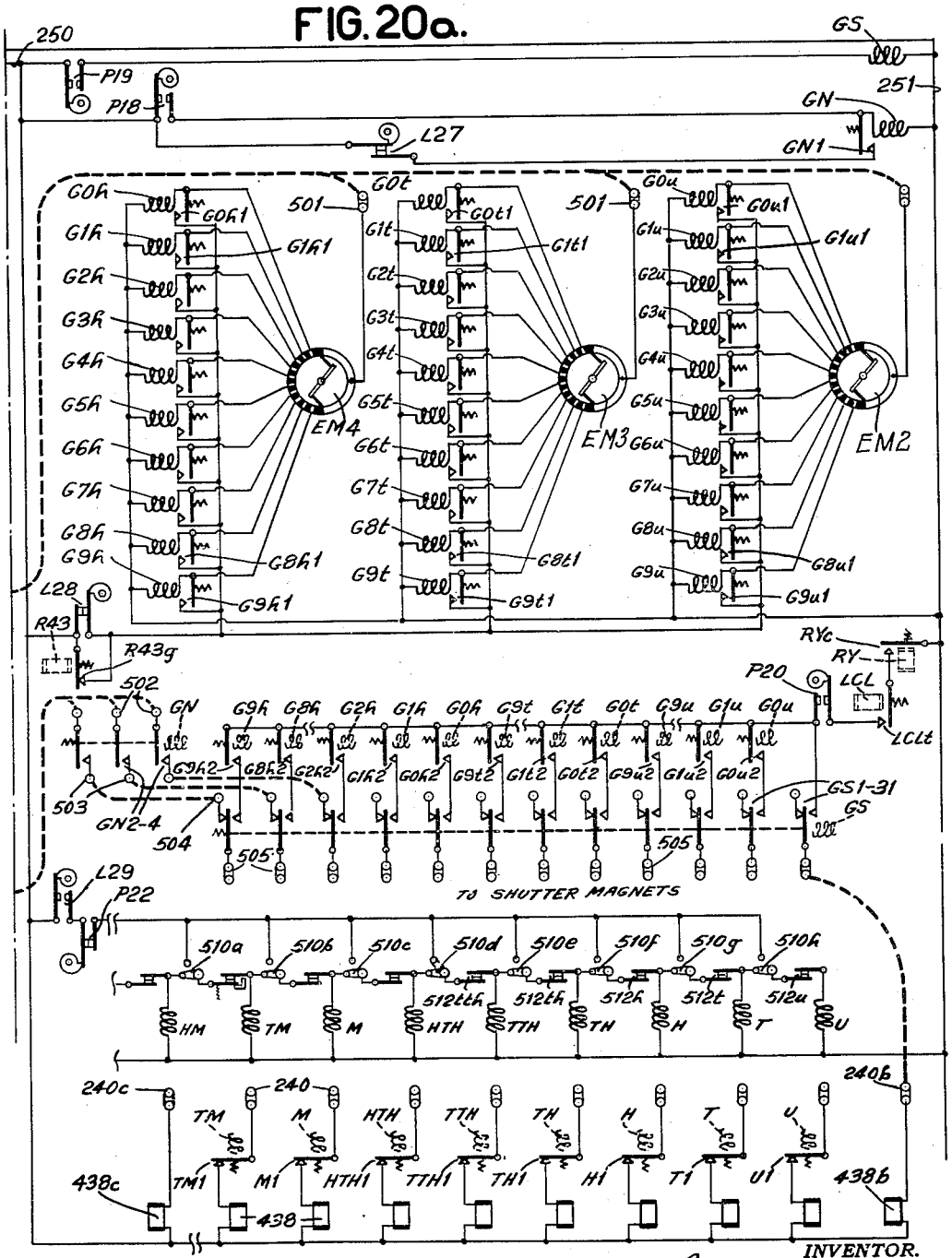

Figs. 20 and 20a, taken together with Fig. 20a to the right of Fig. 20, show the circuit diagram for the complete machine;

Fig. 21 is a timing diagram showing the timing relation of various cam contacts and other devices in the machine;

Fig. 22 is a portion of a film record as made by the machine; and

Fig. 23 is a view of a portion of the drum shown in Fig. 17. This view shows the entire transverse row of control number designating spots and their denominational relation. The view also shows the supplemental or master control spots.

General description of the machine

Before describing the machine in detail, its general features will be briefly pointed out. The machine comprises a photographic recording apparatus including a continuously movable carrier means. The carrier means is preferably in the form of a drum which bears a plurality of series of characters. The drum may be transparent or translucent and the characters opaque, but preferably the present construction provides a drum with an opaque periphery and transparent or translucent characters. These characters comprise the digits from 1 to 9 and 0. A plurality of circumferentially spaced fields of characters are provided on the drum. Each such field has a plurality of parallel columns of character series or sets, each set comprising digits 1 to 9 and 0. Thus, regarding only a single field, ten horizontal or axially parallel rows of characters are provided, with each row circumferentially spaced from the adjacent rows a predetermined differential distance. The drum is rotated continuously in a manner which causes the successive rows of characters in a field to pass an exposure station at predetermined differential times.

The character rows 9 to 0 successively traverse an exposure station at differential times which may be referred to as the 9 to 1 and 0 index times. The period of rotation of the drum from one field of characters to the next may be considered as a cycle or cyclic period of motion of the drum, and this cyclic period may be arbitrarily divided into sixteen different intervals including the aforementioned 9 to 0 index times. According to the present invention, above the uppermost character row, i. e. the 0 row, each field of the drum has a transverse or horizontal row of transparent or translucent control or code spots. In the present instance, for purpose of the disclosure, the drum may be considered as having thirty columns of characters. There is a code spot in each column above the 0 position and in what may be considered the 11 index position of a character field of the drum. At each side of the row of control spots is a master control spot. Each of the two master spots is located within a circumferential band or column of the drum which is to one side of the circumferential bands containing the columns of characters and aligned control or code number spots. The thirty code or control spots which are in alignment with the columns of characters are divided into three groups of ten each. The right hand group is the units order, the intermediate group the tens order, and the left hand group the hundreds order. The differential position of a spot within its group corresponds to a value in the denominational order pertaining to the group. The thirty code spots in a row may be referred to as a family of code spots laterally positionally related according to their codal significance. Provision is made for illuminating the characters and spots on the drum so that they may be photographed on a film. In front of the drum is an exposure station comprising a horizontal row of normally closed exposing apertures. Each aperture is in front of one of the columns of characters and aligned control spots. There are also a pair of exposing apertures for the two master control spots. The exposing apertures are normally closed by individual shutters.

The driving arrangement of the drum is such that one arcuate field of the drum is traversed for each record handled by the accounting machine. One drum zone is also traversed upon each total taking operation. Provision is made for synchronism of drive between the drum and the accounting machine during listing and total taking operations.

Differentially timed means are provided for opening the individual shutters at differential times during the continuous rotation of the drum in order to expose different selected characters 9 to 0 from the drum on to the film. The selection of code spots on the drum for exposure and photographing on the film is effected concurrently, in the present case at the 11 index time and thus a concurrent exposure and photographic recording of code or control spots having a selected codal significance is effected. In the present case one or more of the thirty code marks are selected in accordance with a group identifying number derived at differential times within a cycle from the first card of a group. The differentially timed representation is entered in a data representing or retaining means which provides a positional representation of the group number. There are the usual upper and lower analyzing stations and group control means controlled according to the comparison of group numbers on successive cards at the upper and lower analyzing stations. When the group control means detects the presence of the first card of a new group at the upper brush station, it initiates a total and reset cycle. During this cycle, the group number previously entered in the value retaining means is read out therefrom by a concurrent reading out operation which causes the code spots corresponding to the retained group number to be selected and photographed. One or more code spots will therefore be photographed on a horizontal line of the film, and by their different lateral positions along the film row the exposed spots will represent the group number. Concurrently with the photographic recording of the code spots to designate the group number, the right hand master control spot will be photographed on the film in horizontal alignment with the group number code spots. This master control spot in combination with the code spots affords means whereby the viewing machine of my copending application, Serial No. 342,641, now Patent No. 2,323,372, may select and bring to viewing position the group record. Moreover, this master control spot also serves to denote the beginning of a group record.

After the total and reset cycle, the successive cards of the new group pass through the lower analyzing station, and items sensed on the cards are entered in the accumulators and also control the exposure of characters from the drum to provide a photographic list on the film of the items derived from the successive records of the group. Each item is recorded on a separate line of the film and means is provided to line space the film for each record card passing through the machine. When the last card of the group has been traversed past the lower analyzing station, a total and reset cycle occurs during which the total of the list of items is recorded on a line of the film, and concurrently therewith the left hand master control spot in a drum field is photographed on the film. This in combination with the code spots at the beginning of the group record affords means whereby the viewing machine referred to before may bring the total line of a selected group record to viewing position.

The tabulating machine to which the present invention is shown as applied, is generally of the type shown in patent to Lake et al., No. 1,976,617, but modified in accordance with the patent to G. F. Daly, No. 2,126,621. It may be generally explained that with tabulating machines constructed according to the above mentioned Lake et al. patent, two driving motors are employed. One motor drives the card analyzing and accumulating section of the machine and the other motor is employed for resetting and total taking purposes. When such machines are modified according to the construction of the Daly patent, there is provided a single driving motor which is utilized for card feed, accumulator drive and total taking purposes. This modified arrangement requires a clutching device for interrupting card feeding operations without stopping the accumulator drive mechanism.

General organization of the machine

Fig. 1 shows the general relation of the units of the machine. At the left is a tabulating machine with the customary card feeding and analyzing mechanism. The center section of the machine includes three accumulators. To the right there is shown the recording unit with the photographic recording section. Such section includes the rotating character bearing drum which affords the characters and the control and master spots to be recorded on the film. Below the accumulators is a plugboard.

Machine drive

Referring to Fig. 6, the motor M, through a belt and pulley connection, drives the ratchet of the main clutch shown in Fig. 2. When main clutch magnet 117 is energized, the main clutch shaft 6 is clutched up for drive by the tabulating motor M. Shaft 6 through gearing generally designated 6a in Fig. 6, drives the main shaft 44. Gears 67a on the main drive shaft drive gears 67, one of which is provided for each accumulator. Gears 67, through the shafting and gearing generally designated 67b, drive the clutch shafts 53 of the accumulators.

Drive for resetting and for total recording

Shaft 44 near its right hand end is provided with a gear 44a which, through gears 44b and 44c, drives a machine cycle shaft 19. Fixed to shaft 19 is a gear 84 which drives a gear 83 rigid with a clutch driving element 82. Gear 83 is freely rotatable upon a reset and total shaft 75. Shaft 75 has fixed to it the gear 74 and an arm 76 (see also Fig. 5) which carries a spring-pressed clutch dog 77 normally held in the position shown in Fig. 5 by a latching arm 78 supported by the shaft 79 of magnet armature 80. Energization of total and reset magnet 81 will release the dog 77 for engagement with the clutch driving element 82. The gear 74 provides the usual reset drive to main reset shaft 72 through a gear 73 (corresponding to gear 278 of Fig. 26 of the Lake et al. patent). For resetting each individual accumulator, gears 70 are provided to drive the index wheel shaft 69 of each accumulator unit.

From the foregoing it will be understood that reset will be effected in the customary manner on a total taking operation when totaling magnet 81 is energized.

Recorder drive

Referring again to Fig. 6, the gear 91 at the right hand end of shaft 19, by means of gearing 212a, 212b, 212c drives a gear 213 secured to the character and spot bearing drum generally designated 214. The drum 214 rotates through one revolution for every three revolutions of the shaft 19.

Card feed drive

Main clutch shaft 6 (see Fig. 3) through a gear 12, drives a pair of gears 12a and 12b which are fixed upon a common shaft. Gear 12b in turn drives a gear 12c which meshes with gear 13 of the card feed unit.

Card feed and record analyzing mechanism

Referring to Fig. 3, the usual upper and lower analyzing brushes are indicated at UB and LB and the record cards are successively advanced from the stack R by picker 9 to pairs of feed rolls 10 which serve to advance the cards past the brushes UB and LB in succession. The several card feed rolls are gear-driven in unison in the customary manner from a driving gear 11, freely mounted upon a shaft 8. Sleeve 7 of gear 11 (see also Fig. 4) is rigidly provided with an arm 15 which carries a spring pressed clutching dog 16 normally held in the released position shown in Fig. 3 by an armature latch 17 controlled by a card feed clutch magnet 18. Rotatably mounted on sleeve 7 and disposed between gear 11 and arm 15 are a gear 13 and a rigidly connected feed clutch driving disk 14. Gear 13, as previously described, is driven by gear 12c which in turn, through gears 12b, 12a and 12 is driven from shaft 6.

Referring again to Fig. 3, energization of the clutch magnet 18 trips dog 16 into engagement with the disk 14, thereby clutching the card feeding mechanism to the driving means, and the card feeding mechanism will cause cards to be fed from the hopper and advanced past the brushes UB and LB. Card feeding and analyzing operations will continue as long as clutch magnet 18 remains energized. This magnet is de-energized on total taking cycles and card feeding does not occur then.

Reference may be had to the Lake et al. patent for details of operation of the reset clutch mechanism shown in Fig. 5 and for details of operation of the main clutch mechanism shown in Fig. 2.

Accumulating mechanism

The present machine includes three accumulators. Each of these accumulators is of the form fully described in the Lake et al. patent.

The mode of operation of elements of one order may, however, be briefly described as follows:

Referring to Fig. 8, shaft 53 has slidably mounted thereon, but keyed for rotation therewith, one clutch element 54 for each denominational order of the accumulator. Element 54 is engaged with the short arm of a lever 55 provided with a block 56 normally latched by armature latch 57 of adding magnet 58. A spring 59 bears against the extremity of the longer arm of lever 55 and moves the same, upon release of block 56 by armature 57, to bring the clutch member 54 into engagement with cooperating teeth 60 rigid with the gear 61. This gear is freely rotatable on shaft 53, and when coupled, by clutch element 54, to shaft 53, rotates a gear 62 to displace the accumulator index wheel 63. The usual clutch release is provided and comprises a finger 64 to engage the rearward extremity of member 55 towards the end of the cycle for disengaging the clutch element 54 from teeth 60 and relatching block 56 on armature 57.

Briefly summarizing the adding operation, the magnet 58 may be energized at various points in the cycle of the machine (Fig. 21) depending upon the location of a perforation in a column of a record card analyzed by the lower brushes LB. This energization is effective in response to a perforation in any of the index point positions from 9 to 1, inclusive, to cause index wheel 63 to move 9 to 1 steps. A perforation in the "9" index point position will trip the clutch element 54 nine steps before finger 64 is operated to de-clutch it and a perforation in the "1" index point position will trip the clutch element 54 one step before it is de-clutched by the finger 64. Each step of clutching engagement corresponds to a tenth of a revolution of the accumulator index wheel 63 so that a "9" hole will cause it to move $\tfrac{9}{10}$ of a revolution and the "1" hole will cause it to move $\tfrac{1}{10}$ of a revolution.

Readout mechanism

Also driven by gear 61 (Fig. 8) is a gear 65,

The ratio of gears 65 and 62 is 2 to 1 so that the former will turn a half revolution for each revolution of the latter. Carried by and insulated from gear 65 is a pair of brush assemblies comprising two electrically connected brushes 66. During one cycle, one of the brushes cooperates successively with ten conducting segments 67 while the other is wiping an arcuate main conducting strip 68. During the next cycle, the brushes reverse their positions and functions. The relationship of the part is such that when the index wheel 63 is in its zero position, one of the brushes 66 is in contact with the zero segment 67 and the other brush is in contact with common strip 68.

The brushes 66, segments 67 and common strip 68 provide a readout mechanism for reading out amounts standing on the accumulator, an amount being represented by the position of one of the brushes with respect to the segments. The shaft 69 (Fig. 8), upon which the index wheels of an accumulator are freely mounted, is slotted for cooperation with the usual reset pawls (not shown) carried by the individual index wheels in such a manner that counterclockwise rotation of shaft 69 will advance the index wheels 63 to zero position during a single revolution of shaft 69. Reset drive for shaft 69 is provided for in the manner previously described.

Cam contact devices and the cycles

Referring to Figs. 6 and 9, the shaft 19 is adapted to drive certain L cams. For the present case, thirteen L cams are provided. The same shaft 19, through gearing 91, 90 and 89 drives the emitter drive shaft 85. This shaft drives the brushes of conventional emitters. Four emitters EM1, EM2, EM3, and EM4 are used herein. The two brushes of each emitter make one revolution for every two revolutions of the shaft 19, but during each half of the revolution one of the brushes is successively wiping the segment spots and the opposite brush is wiping the common segment. Suitable gearing 75a, 75b is provided to afford a drive from the reset total shaft 75 to a shaft 92 rigidly carrying the P cams of the machine. These P cams rotate through one complete revolution in two machine cycles and function during total taking cycles. Fourteen P cams are provided herein.

The present arrangement differs from the device of the Daly Patent No. 2,126,621 wherein the P cams make a complete revolution in one machine cycle.

Referring now to Fig. 3, a shaft 93 driven from the card feed gear train operates the F cam contact devices during card feeding cycles only.

The timing relations of the various cam contact devices are substantially shown in detail in the timing diagram (Fig. 21). A card cycle is equal to the period of one revolution of shaft 93 and to the period between the arrival of corresponding points of successive cards at a reference point such as an analyzing station. The card cycle occurs during one machine cycle. During each card cycle, the F cams make one revolution. A machine cycle is equal to a revolution of shaft 19 during which the L cams make one revolution and an emitter brush of emitter EM1 is successively wiping the emitter spots. The reset or total cycle occurs when shaft 75 (Fig. 6) makes one revolution as a result of energization of reset magnet 81. The drive relations of machine cycle shaft 19 and reset cycle shaft 75 are such that during one revolution of the shaft 75, there will be two revolutions of shaft 19. Hence each reset cycle is coextensive with two machine cycles. During each reset cycle, the P cams make one revolution.

Camera recording unit

Referring to Figs. 1 and 9, at the right hand end of the machine there are frame parts 150 which afford support for a box-like housing 151 and for a pair of cross-bars 150a (see also Fig. 16). Secured to the cross-bars 150a are a pair of side frame members 216 (see also Figs. 15 and 16). Within the enclosing housing 151 for the photographic recording apparatus is the character bearing drum generally designated 214 (see Fig. 6).

Referring to Fig. 10 the side frames 216 are provided with forwardly extending lugs 154 receiving studs 155 which pivotally support a yoke, in the form of a U-shaped bracket 156 (see also Fig. 7). The yoke normally assumes, by gravity, the full line position shown in Fig. 10, in which position-adjusting screws 157 abut the frames 216.

The photographic recording mechanism is in operative position when yoke 156 is in the full line position shown in Fig. 10. When it is desired to directly view the character drum, the yoke or bracket 156 is swung to the dotted line position so that the character bearing drum may be visually inspected.

Referring to Fig. 10, the bracket 156 supports a light-tight funnel 158 which at its left end extends to the back plate 159 of the camera unit. This back plate 159 carries a suitable lens and shutter assembly generally designated 160 and including a shutter trip lever 161.

Within the camera device and fixed to the back plate 159 (see Fig. 12) is an assembly plate 162. A stud 163 carried by plate 162 as shown in Fig. 11 affords a support for a film supply spool which is generally designated 164 (see also Fig. 10). A pair of shafts 165 and 166 (Fig. 12) are also rotatably supported by the assembly plate 162 and on these shafts are film feed sprockets 167 and 168 (see Fig. 10). Another shaft 169 affords a support for a take-up spool 170.

Referring now to Fig. 12, shaft 165 has fast to it a ratchet 171 and a driving gear 172. Driving gear 172 meshes with an intermediate gear 173 which in turn is meshed with a gear 174 fixed on shaft 166. A belt 175a transmits motion from a pulley 175 fixed to shaft 166, to a pulley 176 on take-up spool shaft 169. Shaft 166 is slotted at one end to receive a winding key generally designated 177, normally in the retracted position, as shown in Fig. 11. Also carried by the assembly plate 162 is a film feed operating solenoid 180, energization of which will depress an actuating member 181. This member 181 is suitably spring-restored to upper position and upon restoring movement, a pawl 182, carried by the member, actuates the film feed ratchet 171 to advance the film one line space. A flat spring 183 serves as a detent for the ratchet 171.

Referring again to Fig. 10, within the camera housing there is provided a pivoted lever 184 which is spring pressed into contact with the film on the supply roll. When the film is exhausted, member 184 swings clockwise to such an extent that a pair of contacts 185 opens. At other times with film available on the supply spool, the lever 184 maintains these contacts closed. The camera unit is provided with a suitable housing or cover designated 186. This cover is held in position on the back plate by a pair of knurled thumb screws 187. The film which is designated 108 in Fig. 11 is provided with the usual feeding sprocket holes. The film passes successively under the first two film guides 190, through a film gate 191 (see Fig. 10), and then under another pair of film guides 192 (Fig. 11). The film guides 190 and 192 and the film gate 191 are suitably mounted on the assembly plate 162. Also carried by the assembly plate is a solenoid 180S (Fig. 12). Fixed to the plunger of the solenoid is a plate 218 which is normally held in upper position by a spring 218a. Plate 218 is provided with a lug 218b engaged with the shutter control lever 161. Upon each energization of the solenoid 180S, the plate 218, through its lug 218b will operate lever 161 to actuate the main shutter mechanism of the camera unit. According to the present arrangement, the main shutter mechanism is set for a so-called time exposure operation, that is to say, the first actuation of member 161 will open the shutter mechanism and the next actuation will close it.

*Rotating character drum and auxiliary shutter mechanism*

Referring to Fig. 6, it will be understood that the character drum 214 is in continuous rotation so long as the main drive shaft 44 is rotating. According to the present embodiment the drum 214 rotates through one revolution during three machine cycles.

Referring to Fig. 17, the drum has two end plates 400. Secured to the end plates 400 is a cylinder drum 401 which is generally opaque, but which at the character designating portions and code number designation portions is transparent. For clarity of illustration of the drawings (see Fig. 17) the transparent portions are shown by solid lines, while the cylinder which is actually opaque is shown in the reverse manner. Disposed on the opaque cylinder are transparent digit characters 402. Ten such characters 9 to 0 forming an ordinal digit series or set are conveniently arranged in a column in a field and each character is differentially disposed along the coumn in the field in a position corresponding to its value. There are three fields of sets of characters following one another around the drum periphery. For simplicity of illustration each of these fields is shown with only a limited number of columns of characters but in actual practice the number of columns may be extended. In the instant machine, the columnar capacity is thirty columns. Disposed above the digit characters representative of zero and in what may be termed the "11" index point position, is a set of transparent or translucent code marks or spots 402a. There is preferably an individual code spot for each column of digit characters. By providing thirty control spots, as in the present embodiment, a control number of three denominational orders may be codally signified by these spots. Disposed at the left and right of the set of control spots 402a are supplemental control spots 402c and 402b. Spot 402b is used to designate the beginning of a list of items and spot 402c is used to designate the end of a list or the total pertaining to a list.

Briefly, it may be explained that each field of digit characters is acted on during one cycle of a number of successive cycles. Individual shutters are provided, one for each circumferential column-bearing band of the drum and for the control spots 402a. Supplemental shutters are provided for the master control spots 402b and 402c. By opening an individual shutter at the proper differential time in a cycle when the digit characters are being traversed past the exposing position, the related digit in a character column will be exposed and selected for photo-transference to the film. Also by operating a shutter at the common time when the control spots 402a, 402b and 402c are being traversed past the exposing position, one or more of the control spots may also be selected and exposed for photo-transference to the film. Suitable illuminating means is provided within the drum. This illuminating means in cooperation with a lens system projects character images and control spot images on to spaced portions of a film line when the shutters are open. Accordingly, by proper timed actuation of the individual shutters in relation to the operating cycle, any digit values and any control spot designations may be projected upon the light sensitive element, conveniently referred to as the film, in the camera unit. Selection of a digit character is effected by correspondingly differentially timed actuation of the shutters. Selection of a particular control spot is effected by a selective shutter actuation at the 11th index point position in the cycle. By reference to Fig. 23, it will be noted that there are thirty transversely aligned code spots 402a, arranged in three groups of ten each, the right hand group for units, the middle group for tens, and the left hand group for hundreds. By selectively actuating a shutter opposite one of the code spots in each group, any desired three order control number may be selected and photographically represented in code in corresponding positions along a transverse row of the film.

Film feed is effected at the time an opaque portion of the drum chart which lies between the row of control spots and the next following row of digit characters representative of 9 is traversing the exposure line. The shutters are also restored at this time in the cycle.

In detail, the drum 214 as previously described is driven from gear 91 (Fig. 10) through gearing 212a, and 212b, 212c to gear 213. Gear 213 is affixed to a hub 405 on the right hand end plate 400 of the drum (see also Fig. 16). Hubs 405 on the drum are rotatably mounted in the fixed end frames 216, preferably upon ball bearings. In order to secure brilliant illumination, a light source is provided within the drum. By providing the source of light within the drum, the light may be transmitted through the transparent characters or code spots on the drum to brilliantly contrast the transparent characters or code spots with respect to the opaque portion of the drum chart. It is furthermore advantageous to provide the source of light within the drum because this affords proper space outside the drum for the disposition of the individual shutters.

Before describing the way in which the light source is mounted within the drum, it may be first explained that it may be desirable to compensate for the motion of the drum during film exposure to avoid any possibility of slight blurring of characters or code spots when the device is operated at extremely high rates of speed. Accordingly, there is also provided in association with the drum a system of compensating prisms which will be described later.

Referring, for the present, to Fig. 16, fast to the opposite side frames 216 is a pair of brackets 408. Secured to brackets 408 are other brackets 409 which extend through the hollow hubs 405 of the drum to a point within the drum. Mounted on the brackets 409 are a pair of terminal sockets 410 for receiving a cylindrical incandescent lamp generally designated 411. This lamp is of the conventional tubular variety. Preferably, the back half of the lamp is silvered as shown at 411a to provide a reflector. Brackets 409 also afford support for a cross-bracket 412. This bracket 412 provides support for a lens system generally designated 413 (see Fig. 14). Such lens system may comprise a pair of condensing lenses 414 to direct the light received from the light source 411 upon a small double concave lens 415. This system of lenses will direct a straight beam of light of proper depth to impinge upon one horizontal row of characters or control spots across the drum periphery when the row is at an exposure station. The lens system is also of such character as to direct the rays of light in a substantially parallel direction towards the drum periphery. It will be understood that the lenses used in the system, are, preferably, long or so-called cylindrical lenses and, accordingly, the light derived from the light source 411 is focused upon the entire length of the character or control spot row at the exposure station.

The compensating means for the image projecting beams comprise prisms 418a and 418b, which are respectively inside and outside the drum. These prisms are of octagonal shape and they are mounted in octagonally recessed end plates. The carrying plates for prism 418a are designated 419a and those for prism 418b are designated 419b (Fig. 16). Right hand end plate 419a is rigidly carried by a shaft 420 which has a gear 421 fast thereto. Gear 421 meshes with an internal ring gear 424a fixed to the right hand side plate 400 of the drum. Right hand end plate 419b is fast to a shaft 422 which has fixed to it a gear 423 receiving drive through idler gears 425 from an external spur gear 424 which is fixed to the right hand side plate of the drum.

It will be clear that through the above gearing both prisms will rotate during rotation of the drum and that their rotation will be synchronous with the rotation of the drum. Drive relations between the drum and the prisms 418 are such that the prisms rotate one-eighth of a revolution during the passage of a character or control spot row or line past the beam of light projected from or which emerges from the lens system.

The arrangement of the gearing is, further, such that the prisms rotate in opposite directions. Prism systems of this character are fully described in the United States Patent to Hopkins No. 1,204,771. Briefly stated, however, the action of the dual prism system is such that the inner prism during the motion of the drum bends the light beam downwardly and the outer prism corrects this downward motion so that during the interval when the picture is being taken the effect is equivalent to halting the motion of the drum or momentarily arresting the character row at the exposure station. Accordingly, even though the actual object, i. e. the transparent character or control spot is in motion, its image which it is being photographed remains stationary during exposure time.

The above correcting prism system is deemed desirable when extremely high speed of operation is desired. In practice, however, such correcting prism systems may be omitted when slower speeds are employed.

Shutter construction

Figure 15:
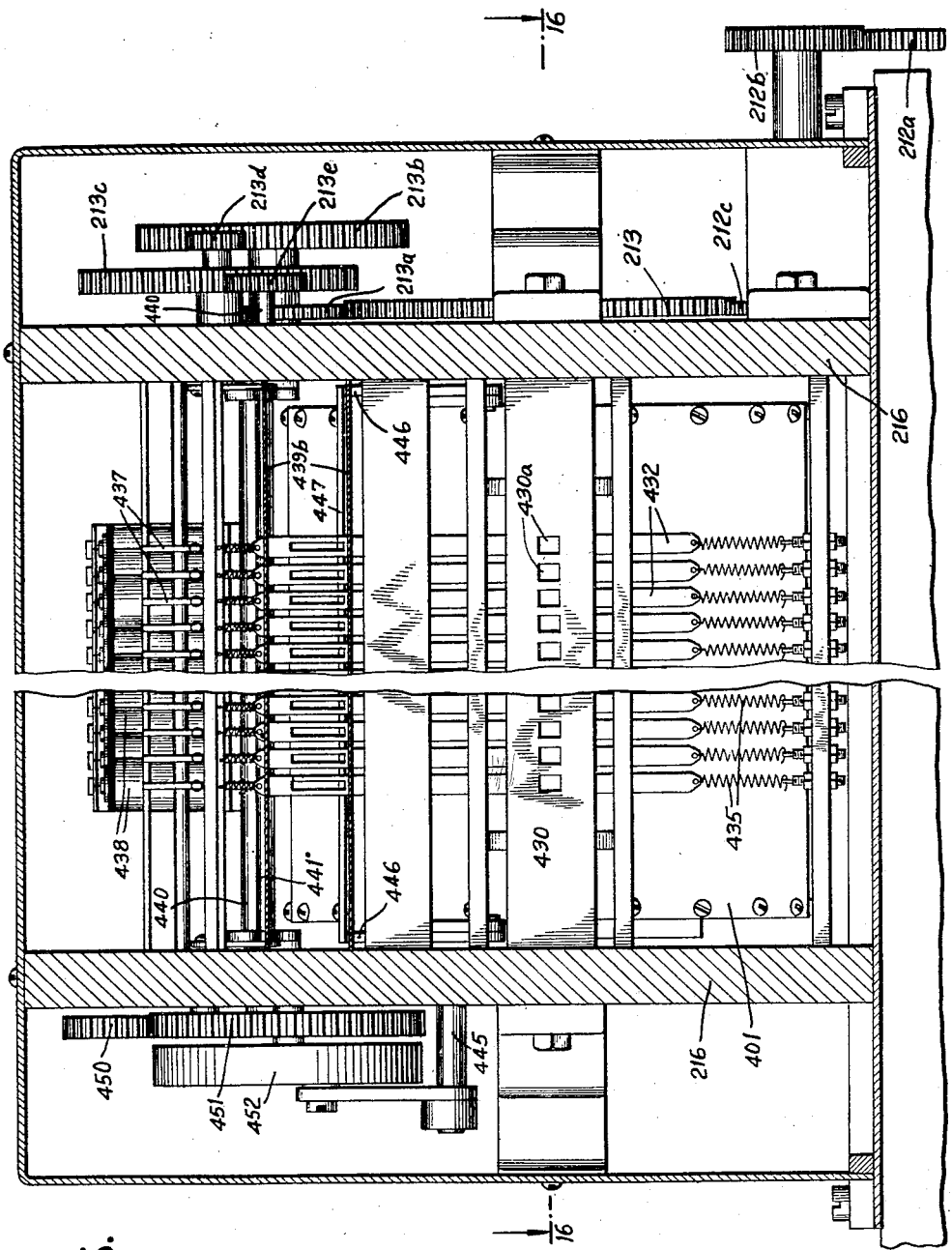
Fig. 15 is a detail sectional view taken on line 15—15 of Fig. 14, showing the shutter mechanism.

Referring to Figs. 15 and 16, secured to the frame members 216 is a transverse plate 430 provided with a plurality of rectangular apertures 430a. There is an aperture 430a provided for each column containing digit characters and the aligned code spot. There are also apertures 430a for the master control spots 402b, 402c. Each aperture is opposite a corresponding columnar band of the drum and defines an exposure position across which the digit characters 9 to 0 of a column move successively during a cycle and across which the code spots 402a and master spots 402b and 402c move concurrently at the "11" index point time in a cycle. These apertures constitute an exposure station and afford sight openings through which the drum can be viewed by the camera. Extending from the rear of the plate 430 are comb-like projections 431, serving as side guides for the auxiliary, individual shutters 432. These shutters are vertically disposed strips of thin lightweight material and each strip is provided, intermediate its length, with a rectangular exposure slot or opening 433 (Fig. 18). Each shutter is connected at the top to an individual lifting spring 434 and at the bottom to an individual depressing spring 435. Spring 435 is a more powerful spring than spring 434. To retain the shutters in upper or normal position (see Fig. 14), each shutter is provided with a lug 436 engaged by an individual latch 437 adapted to be tripped upon energization of a shutter magnet 438. In order to insure exact coincidence of time of shutter action a supplemental control is provided. Such supplemental control comprises a pair of arms 439 suspended intermediately by links 439a and oscillated by rotation of sleeves 440a eccentrically carried by a shaft 440. Fixed between the outer ends of the arms 439 is a bar 441 which lies in back of all the shutter latches 437 (also see Fig. 19). Shaft 440 is driven by a gear train (Fig. 10) including gear 213a—driven from gear 213 of the drum—and gears 213b, 213d, 213c and 213e. The drive ratio is such that bar 441 is moved back and forth for each one-forty-eighth of a revolution of the character drum. Each drum revolution requires three of the machine cycles (see the time chart, Fig. 21) and each cycle is divided into sixteen cycle points or differential intervals; hence the bar 441 makes one oscillation during each cycle point. During any of the first eleven points of the cycle, one or more of the control spots or of the digit characters traversing the exposure station during the cycle point may be selected and photographed. The selection of the control spots and characters is effected by energization of the appropriate shutter magnets 438 tending to release the shutter latches 437, but the actual release of the latches is timed by the oscillating bar 441 to occur at a definite time within the cycle point. Thus, if a shutter magnet be energized too early, nevertheless the release of the associated shutter would be timed accurately to occur at the same relative time within a cycle point as the release of other shutters. Accordingly, characters or control spots of the different columns of a drum field will be exposed by release of the shutters during the same or different points of a cycle for an equal duration of time and their images transcribed on the film will be of predetermined height and disposed in accurate alignment. Preferably, to guide the shutters adjacent the latch point a comb 439b is provided (see Figs. 14 and 19).

It was previously explained that the camera is so located that it is properly focused upon the drum 214. If, for example, it be desired to record the digit 4 from the extreme left hand column of the drum 214, shutter trip magnet 438 of this column will be energized at the 4 index point in the cycle. This will tend to trip the latch 437. Thereafter, when the eccentric 439 moves to the left, the related shutter 432 will snap downwardly under the influence of the strong lower spring 435. This will cause the slot 433 in the shutter to pass the aperture 430a in plate 430. Accordingly, the digit 4 will be exposed upon the film. In a like manner, digits from other columns may be recorded at differential times.

It may be here explained that exposure of the code spots is effected during one of the reset cycles of the machine and during a cycle in which no exposure is being made of digit characters. As will be hereinafter explained, such recording of code spots is effected in the second half of the total and reset cycle. Toward the end of each recording cycle and during the time when the opaque portion of the drum between the code spots and the row of digit characters representative of 9 is traversing the exposing position restoration of the shutters will be effected. This is provided for as follows: At such time, the shaft 445 (Fig. 14) is rocked counterclockwise to lift slides 446 carrying a cross-bail 447. Bail 447 has a comb-like edge and the tongues 447a of the comb (see Fig. 18) pass through slots 432a in the shutters 432. Thus any released shutter will be elevated and relatched by its latch 437. Rocking movement is imparted to shaft 445 in the following manner.

Referring to Figs. 10 and 13, gear 213b drives a gear 448 which is fast to one end of a shaft 448a. At the opposite side of the machine (see Fig. 13), this shaft is provided with a gear 448b which, through an idler gear 450, drives a gear 451 having fast to it a box cam 452. The follower which cooperates with this box cam is connected to shaft 445. The driving relations of the gearing just described is such that cam 452 rotates once for each card cycle of the machine and rocking movement of shaft 445 is effected at the time the opaque portion of the drum between successive drum fields is passing the sight openings.

Referring now to Fig. 18, in this view several shutters 432 are shown in partially actuated position, at the moment when their openings 433 are transiently registering with the sight openings 430a of shield 433. The shutters which are partially actuated are in columns 2, 4 and 8 from the left. As shown, with a "3" character now at the exposure station, the open shutters are exposing the digit 3 in all three columns.

Referring to Fig. 14, a set of auxiliary contacts 512 are provided which are used to indicate the recording of a significant digit in a column. One of these contacts 512 is associated with each recording magnet 438. The pull rod 432a is shaped as shown in Fig. 14a, being slotted to receive an auxiliary latch 437a. When a recording magnet 438 is energized, its associated latches 437 and 437a are rotated to respectively release the shutter 432 and unlatch the contacts 512. The contacts 512 are normally closed contacts and move to open position when unlatched. To restore the contacts 512 to closed position, a supplemental restoring bail 447a is provided which is actuated by the mechanism which operates the shutter restoring bail 447.

General operation of the camera may be summarized as follows: The cover 186 (Fig. 12) is first removed, the camera loaded and the cover replaced. Upon energization of solenoid 180S, the main shutter mechanism is opened. With the main shutter open, when the auxiliary shutters 432 are tripped, a section of the film is exposed. Upon each energization and subsequent deenergization of film feed magnet 180 (Fig. 12), the film is advanced one line space, bringing a new section of unexposed film to the film gate. Eventually, when a series of card handling operations is completed, the main shutter solenoid 180S is again energized to close the main shutter 160. When depletion of the film supply is sensed by lever 184 (Fig. 10) the film lever contacts 185 open, causing machine operation to be interrupted. The operator may then depress the wind-up key 177 and wind up the remaining end section of the film on the take-up reel 170. The film may be then removed and the camera reloaded.

Each roll of film may then be developed, fixed and dried. Suitable print enlargements of any size or length may be made as desired from such film. Furthermore, duplicate copies in any desired number may be printed. Reversal film may likewise be used if desired. After the film which is made by the present machine has been developed, it may be placed in a film viewing machine of the type shown and described in my copending application, Serial No. 342,641, filed June 27, 1940, now Patent No. 2,323,372. By the use of this machine selection of portions of the film for visual inspection may be afforded under control of the code control spots 402a and one or the other of the master control spots 402b and 402c.

Circuits and operation

The foregoing description has been directed to the mechanical structure and parts for recording digits and spots on the film in the camera unit. Before describing the circuit diagram of the machine and the operation in detail, it may be explained that for a listing operation during which amounts derived from record cards of a run are to be listed and recorded on the film, provision is made for selectively energizing the shutter trip magnets 438 under control of the analyzing devices which comprise the lower brushes LB (Fig. 20) which analyze the record cards in succession. On the other hand, during a total taking operation, the shutter magnets are connected to the readout devices 66—67—68 (Fig. 8) which are positioned by the accumulators to represent the total of the amounts accumulated from a group of cards.

During the first card feeding cycle for each card group, the group indication number is also recorded by digital characters on the film. This recording is effected at the same time the data from the first card is being listed.

It will be assumed for the following description that it is desired to list items derived from a stack of pre-punched record cards placed in the supply magazine of the machine. Further, it will be assumed that it is desired to record a total of the amounts accumulated from each group of record cards.

To prepare the machine for such mode of operation, plug connections (not shown) are made between plug sockets 238 (top of Fig. 20) and those sockets 237 (lower portion of Fig. 20) associated with the lower brushes LB which sense the card columns bearing the items it is desired to list. Further plug connections are made from sockets 239 to sockets 240 (lower part of Fig. 20a) which connect to the shutter trip magnets 438. If it is desired to record the total in the same columns of the film as the listed data, sockets 239a, associated with the total readout commutators, are connected in parallel with sockets 239. If it is desired to record the total in other columns of the film, the sockets 239a are directly connected to the proper sockets 240. The socket 239c (Fig. 20) is connected to the extreme left hand socket 240c which connects to the shutter magnet associated with master control spot 402c. This provides for spot recording on a line with the total. Plug connections are also made from plug sockets 241 which relate to the upper brushes sensing the group indication number to plug sockets 501 (Fig. 20a). The plug sockets 501 are connected to a value retaining device for retaining the group indication number. The plug sockets 237 which relate to the lower brushes analyzing the group indication number are connected to plug sockets 502. Further connections are made from sockets 503 to sockets 504 in the proper columns for recording the group indication number. The sockets 505 are all plugged to the sockets 240 (Fig. 20a).

Group control plug connections are made from selected denominational orders of the upper brush sockets 241 (lower right of Fig. 20) and from the corresponding orders of lower brush sockets 237, respectively to the plug sockets 242 and 243 which are connected to opposite sides of the proper group control magnets GC. Assuming that group control is to be effected from a field of three card columns, a plug connection is made from a socket 244 (third socket up from the bottom) connected to the group control relay contacts to a socket 245 and a switch 246 is thrown to open position as shown in the lower portion of Fig. 20.

The accumulator magnets 58 (bottom of Fig. 20) are controlled from index points in selected card columns by connecting them to the proper lower brushes LB by means of plug connections made between lower brush sockets 237 and accumulator magnet sockets 247. For a listing operation, switch 248 (middle of Fig. 20) is turned to the LIST position as shown. For the present it will be assumed that the so-called zero suppression feature of the machine is rendered inoperative by setting all the switches having the common reference number 510 (lower part of Fig. 20a) in lower, full line position.

To place current on the supply lines 250 and 251 of the machine, the operator closes main line switch 249 (upper right Fig. 20). When this is done, a relay coil R40 (left side of Fig. 20) is energized because contacts L19, R43d, and P9 are initially closed. With relay coil R40 energized, its contacts R40a (upper left of Fig. 20) are closed and as the L2 contacts are initially closed, a circuit is established through the reset magnet 81 (also see Fig. 5). This results in clutching of the reset shafts 75 and 92 to the machine cycle shaft 19. However, the reset mechanism is not yet effective because the main drive has not been set in operation. The operator now depresses the reset key to close contacts 110 (middle of Fig. 20). This results in energizing a relay coil R30 which closes its contacts R30a to complete a circuit from line 251, through stop key contacts SP1 (right side of Fig. 20), film lever contacts 185, relay contacts R30a, relay coil R25, clutch magnet contacts 116, motor clutch magnet 117, and to the opposite side 250 of the line. When magnet 117 energizes, contacts 116 open, shunting the circuit through relay coil R1 which is thereby energized to close contacts R1a and establish the circuit of motor M. With the motor in operation, the main drive is in action and since reset magnet 81 is energized, reset cams P (Fig. 6) advance from the start of the D position (Fig. 21). The L cams also rotate because they are on the shaft 19 which is always driven whenever the main drive and motor M are in operation. A reset cycle now takes place and as explained before, there are two machine cycles coextensive with one reset cycle. As soon as the relay coil R25 is energized, it closes contacts R25a to shunt out the contacts R30a through cam contacts L1. Near the end of the first machine cycle, the L1 cam contacts open but at that time the reset cam contacts P1 are closed and prevent opening of the motor clutch circuit, so that the motor and main clutch continue in operation for the next machine cycle and until the end of the reset cycle. During the reset cycle, contacts P9 open and break the circuit of relay coil R40. Hence, the reset clutch magnet 81 will be de-energized and conditioned to interrupt the operation of reset mechanism at the end of the reset cycle. During the second machine cycle of the reset cycle, a circuit is completed through cam contacts P19 to energize relay coil GS (upper part Fig. 20a). Energization of relay coil GS at this time, however, is ineffective and its purpose will be described subsequently. Towards the end of the reset cycle, contacts P7 close, energizing a relay coil R43 by a circuit extending through P7 (lower left of Fig. 20), coil R43, lower card lever relay contacts LCLb, upper card lever relay contacts UCLb and back to line. Coil R43 closes contacts R43a to shunt contacts P7 and establish a stick circuit for R43. Relay coil GN is energized at this time by a circuit through cam contacts P18 (Fig. 20a). Relay coil GN is also ineffective at this time and its purpose will be explained later. Near the end of the second machine cycle, cam contacts L1 open and with reset cam contacts P1 also open and contacts R30a having been previously opened because of release of the reset key, the relay coil R25 and motor clutch magnet 117 are de-energized and the motor circuit broken.

At the end of the above reset cycle, coil R43 is energized, contacts R43d in the circuit of coil R40 are open, and with the latter coil de-energized, its contacts R40b are closed. The operator now depresses the start key to close contacts 119 completing a circuit through coil R33, contacts R40b, and coil R32. After being once energized through the start key circuit, coil R32 is cyclically energized at the time shown in the timing diagram under control of cam contacts L3. Coil R33 when energized closes contacts R33a which replace contacts R30a in completing the circuit through coil R25 and motor clutch magnet 117, followed by the making of the motor circuit. Coil R32 closes contacts R32a and with contacts R43c now closed, due to energization of coil R43, a circuit is completed through a coil R39 (left side of Fig. 20), through R32a, stop key contacts SP2, contacts R43c, cam contacts P9, to line. The stick circuit for coil R39 is completed through stick contacts R39a and through the relay contact LCLp and then through the path previously traced for the pick-up circuit. Coil R39 closes contacts R39b establishing the circuit of card feed clutch magnet 18 (see also Fig. 3). A card cycle now occurs and the first card is fed to the upper brushes. During this cycle there is an ineffective energization of all of relays of the G group, such as G0h, G1h, G0u, etc. of the value retaining means. The energizing circuit is from line 250 (Fig. 20) cam contacts L12, contact roll and upper brushes plug sockets 241, via plug connections to plug sockets 501 (Fig. 20a), through emitters EM2, EM3, EM4, and as these rotate through the various segments, to the different relay coils G of the value retaining means, and back to line 251. These relays are maintained energized through relay contacts G0h1, G0t1, G0u1, etc. and cam contacts L28. Relay contacts R43g being open at this time have no effect in shunting L28. The energization of the G value retaining relays is ineffective at this time. Near the end of the first card cycle, cam contacts L1 open, causing the main clutch to disengage and the motor M to stop at the end of the cycle. Also, near the end of the first card cycle, the first card closes upper card lever contacts 120 to energize coil UCL which closes contacts UCLs to establish a stick circuit through cam contacts L5. Coil UCL closes the UCLh contacts to establish a circuit through main shutter operating solenoid 180S (right center of Fig. 20) which circuit extends through the still closed contacts LCLh. Solenoid 180S (also see Fig. 12) now opens the main shutter of the camera unit as explained hereinbefore.

It will be understood that all of the cards are perforated in the group number field with perforations at the index point positions which are representative of group numbers. Provision must be made for retaining the reading of the group number so that the group number may be subsequently recorded by combinations of control spots 402a upon the film. Such recording of control spots occurs subsequent to the reading of the card by the upper brushes. For this purpose the group number retaining relays generally designated G are provided.

After completion of the first card cycle, the start key is again depressed to cause the machine to go through a second card cycle. During this cycle the first card is sensed by the upper brushes UB (Fig. 20) and circuits are completed at differential times to energize the corresponding group number retaining G relays. For example, assume a group indication number as 762. At the seventh index point a circuit is completed from line 250 through cam contacts L12, upper brush UB which is sensing the hundreds column of the group indication number, a plug wire between socket 241 and socket 501 connected to emitter EM4, through the seven segment spot therein to relay coil G7h and back to line 251. Relay G7h is maintained energized through its stick contacts G7h1 and cam contacts L28 as previously described. In like manner relays G6t and G2u are energized. Accordingly, the group number of 762 has been set up in the group number retaining device.

Toward the end of the second card cycle, the first card closed lower card lever contacts 122 (right center of Fig. 20) to energize coil LCL which is held through stick contacts LCLs and cam contacts L6. Coil LCL now opens contacts LCLh to de-energize main shutter solenoid 180S. Contacts LCLg close and complete a circuit through a relay coil RY, the function of which will be described later when last card conditions are explained. The upper card lever relay coil UCL and the lower card lever relay coil LCL are now energized; their "a" contacts (upper right of Fig. 20) are closed and maintain a circuit through the main clutch magnet 117 and motor control coil R1 closed until cards are exhausted.

The previous description has explained that the first card of the run has been traversed past the upper brushes and that the group number from the first card has been read by the upper brushes and set up and retained on the group number retaining relays generally designated G. Since the card is the first card of a run, there is no card under the lower brushes and under this condition the machine functions as if a change in group number had occurred.

Card handling operations are terminated and a reset cycle of the machine ensues. The first machine cycle of this reset cycle is an idle one so far as operations are concerned pertaining to the first card of a group. However, in the second machine cycle of a reset cycle the amount of the group number which is retained on the group number retaining relays is read out from these relays and printed in the form of control spots upon the film. Following this phase of operation, card feed is resumed. With such resumed card feed the first card of the group is traversed past the lower brushes. The group number is again read out by the lower brushes and at this time such group number is digitally recorded upon the film. Along with the recording of the group number of the film at this time there is the recording of other listed items derived from the record card.

Further card feed cycles ensue. As each card is fed there is a new setup of the group number retaining relays, this setup being effected from the upper brushes. When a change in group number occurs, card feed operations again terminate and the setup of the group number retaining relays which is usually broken down is maintained so that the group number can be subsequently recorded. The machine then starts a total and reset cycle. On the first half of the total and reset cycle the amount or amounts in the accumulators is digitally recorded on the film and in the second half of the reset cycle the retained group number is recorded on the film. In this case the recording is by the control spot representations on the film.

From the foregoing, it will be understood that the shutter magnets are to be selectively energized in either of two ways. They can be energized directly under the control of the lower brushes in which event the digital characters will be exposed upon the film or the shutter magnets may be selectively energized under control of the group number retaining relays in which case the group number will be recorded in the form of control spots on the film.

The circuits will now be described for terminating card feed operations and initiating the total and reset cycles which follow the first card of a group.

Controls for termination of card feed and reset initiation

With coil UCL now energized through its stick circuit, contacts UCLb in the circuit of coil R43 are now shifted but a shunt circuit is maintained through cam contacts F3. During the second card feed cycle, the latter open and coil R43 is de-energized, contacts R43c open, breaking the circuit of coil R39 which in turn causes contacts R39b to open and de-energize the card feed clutch magnet 18. Also, with coil R43 de-energized, its contacts R43d are closed and upon closure of contacts L19, coil R40 again is energized. Contacts R40a close and when cam contacts L2 close, the circuit of reset magnet 81 is established and as a result a reset cycle will follow directly after the second card cycle. With relay R43 de-energized the relay contacts R43g are closed and coils G7h, G6t and G2u are maintained energized even though cam contacts L28 open. Accordingly, the setup of the group number is retained in the G relays.

The reset magnet 81 was energized during the second card cycle and a reset cycle automatically follows the second card cycle. It will be recalled that card feed clutch magnet 18 is now de-energized so that card feed does not occur during the reset cycle. During the reset cycle relay coil GS is energized as previously described. Accordingly, relay contacts GS1—31 (Fig. 20a) are shifted and upon closure of cam contacts P20 at the "11" time in the cycle, circuits are completed from line 251, through relay contacts RYc, contacts LCLt, contacts P20, the contacts G7h2, G6t2 and G2u2, through the contacts of relay coil GS, plug sockets 505 and via plug connections to the plug sockets 240 to the related shutter magnets 438. Contacts P20 close at the "11" index point in the cycle and the shutter magnet 438 pertaining to the 7 spot 402a in the hundreds group (see Fig. 23), the shutter 438 pertaining to the 6 spot 402a in the tens group and shutter magnet 438 pertaining to the 2 spot 402a in the units group are energized. All three shutter magnets are energized concurrently so that the film will be exposed with a series of three spots which, by their relative lateral disposition, are representative of 762 (note the spots 402a' in Fig. 22). Since these spots 402a are in columnar alignment with digital characters on the film, a special master spot control must be provided to relatively distinguish the control or code spots from the digital characters or portions thereof. Accordingly, provision is made to provide a supplemental master control spot 402b' on the film. This spot it will be noted, is in horizontal alignment with spots 402a' but to the right of the field which receives the digital characters. Accordingly, spot 402b' will afford a supplemental control when the film is used in a viewing machine to provide for the distinguishing of control spots from digital characters. The spot 402b' has a further purpose in that it denotes a point on the film which is at the beginning of a list, in contradistinction to a point on the film at the end of a list where a total might be recorded. The circuit which controls the recording or exposing of the aligning spot 402b' is traced as follows: A circuit is established from line 251, through the RYc and LCLt relay contacts, cam contacts P20, GS1, the plug connection betwen the right hand socket of the 505 group and socket 240b, thence to shutter magnet 438b which controls exposing and recording from the extreme right hand column on the drum which carries spot 402b. Following the recording of the coded spots and the master control spot, it is necessary to effect a line space of the film. This line space operation is brought about in the following manner. A circuit is completed through relay contacts RYd (Fig. 20), relay contacts LCLu, cam contacts P21, solenoid 180, cam contacts L25 and back to line. Energization of solenoid 180 and subsequent de-energization thereof will effect a single line space so that an unexposed film line will be available for recording purposes. Coil LCL is now energized and contacts LCLd are closed and upon closure of cam contacts P13 the relay coil R100 (lower left of Fig. 20) is energized. The coil R100 is held energized through stick contacts R100a and cam contacts P11. Previously, during the reset cycle, the contacts P7 were closed and coil R43 was energized. Contacts R43d open and relay R40 remains de-energized, having previously been de-energized by opening of contacts P9. Contacts R40a, therefore, are open and reset magnet 81 is de-energized to stop the reset mechanism at the end of the reset cycle. With R43 now energized upon opening of cam contacts L28 the G relays are de-energized. Card feed is now to be resumed. During reset with R40 de-energized, contacts R40b are closed and coil R32 is energized when contacts L3 close. With R32 energized, contacts R32a close and a circuit is made through coil R39 which circuit also extends through the cam contacts P9 and P43c contacts. With R39 energized, contacts R39b close and upon closure of contacts L2, card clutch magnet 18 is energized. Thus, after the second reset cycle, the cards will be fed in succession and analyzed by lower brushes LB for values. It should be noted that when relay coil R100 was energized during the last mentioned reset cycle, it closed contacts R100d, shunting contacts P17 and providing an auxiliary holding circuit for coil RY extending also through stick contacts RYa.

The first card of the group is about to pass the lower brushes. During the ensuing card cycle, amounts are derived from the card for accumulation, the group number and item amounts are derived from the card and recorded on the film by digital character recording. The control circuits for bringing about these operations will now be described.

At the beginning of the card cycle, with relay coil R100 energized and its R100b contacts (middle of Fig. 20) closed, a circuit is established as follows: From line 251 through R100b, switch 248 in list position, a coil J, cam contacts L23, cam contacts P10, magnet 180, cam contacts L25 and back to line 250. This circuit remains energized until shortly after the sensing of digit positions 9 through 11 of a card is completed. The magnet 180 is then de-energized when the L23 contacts open and the film advances one line space in the camera unit.

During the sensing of the digit positions, coil J is energized, holding a group of Ja contacts closed to connect sockets 238 and 239 (top of Fig. 20). Let it be assumed that a pair of tens and units card columns are perforated respectively in the "4" and "6" index positions, thus designating a value of 46. When the "4" perforation is sensed by a lower brush LB, a listing circuit is completed from line 251, through the card lever contacts 122, thence through the customary circuit breaker contacts L26, through cam contacts F1, the contact roll of the lower brushes, the brush sensing the "4" perforation, a plug connection from the 237 socket in the tens order to a selected 238 socket. Thence the circuit will be completed through a pair of relay contacts Ja, the connected socket 239, through a plug connection to a selected socket 240 (Fig. 20a), through a now closed contact T1 of relay T, through the proper shutter trip magnet 438 and back to line 250. It is clear that with magnet 438 energized at the 4 index time in the cycle, the shutter mechanism 432 will be actuated in the manner previously described and the digit "4" recorded on the film in the proper position. In the units order, when the 6 index point traverses the lower brush, a circuit is established via the path previously traced to the contact roll, through the lower brush in the units order, through the plug connection from the units order socket 237 to socket 238, through a pair of contact Ja and through a plug connection between the proper socket 239 to socket 240 to energize the shutter trip magnet 438 in the units column. This will cause photographic recording of the digit "6" in the proper position on the film.

During this cycle the relay coil GN (Fig. 20a) is energized, having been energized during the reset cycle under control of cam contacts P18 and maintained energized by relay contacts GN1 and cam contacts L27. Accordingly, relay contacts GN2—4 are closed and a circuit for recording the group control number is completed. This circuit extends from line 251, card lever contacts 122 (Fig. 20) cam contacts L26 and F1, contact roll and lower brushes LB sensing the group control number, from the proper plug sockets 237 via plug connection to plug sockets 502 (Fig. 20a), through the GN2—4 relay contacts, via plug connection from sockets 503, to plug sockets 504, through the proper relay contacts GS1—31, plug sockets 505 and via plug connections to proper plug sockets 240 (Fig. 20) through the corresponding shutter trip magnets 438 and back to line 250. Selective energization of the 438 magnets will effect recording of the group control number in the manner previously described for listing. The group number is recorded on the film only for the first card of a group since cam contacts L27 open and break the holding circuit for coil GN.

After sensing of the digit positions, the magnet 180 de-energizes and the film advances one line space, as previously described and during travel of the next card past the lower brushes, a new amount is recorded on the film. Concurrently, with the recording of values from the card, an accumulating operation is effected in the following manner. A circuit is completed via the path previously followed to a lower brush plug socket 237, thence through a plug connection to a socket 247, an accumulator magnet 58 and back to the other side of line 250. Accordingly, as each value from the record card is photographed on the film, it is also accumulated.

Similar card cycles follow for the successive record cards of a group. In each card cycle there is an exposure on the film of digit values derived from the drum. These values are selected according to the impulses differentially transmitted from the card. These operations continue until change in a card group occurs.

When a change in card group occurs, the usual shunt circuit afforded by the group control unit around contacts F3 is broken (see Fig. 20). This, in a known manner, brings about the de-energization of R43 which as explained before causes the card feed, to be interrupted at the end of this cycle. With relay R43 de-energized, contacts R43d reassume the position shown and a circuit is established through P9 and L19 to energize relay R40. With relay R40 energized, contacts R40a close and reset magnet 81 is energized to cause a reset cycle to follow the last card cycle of a card group.

During the first half of the reset cycle, the total standing in the accumulators is read out and recorded on the film and a special total indicating spot is recorded. During the second half of the reset cycle the accumulators are reset in the manner explained previously. Also during the second half of the reset cycle, spot recording of the group number for the next group of cards is effected. In the reset cycle, upon closure of contacts P12 (Fig. 20), a circuit is made through a coil JT and the film feed magnet 180. Since contacts P10 are now open, coil J is not energized and the contacts Ja are open to isolate the lower brushes from the shutter magnets. With coil JT active, a group of contacts JTa individually connected to the orders of the readout commutator are closed to prepare circuits for differentially operating the shutter magnets according to the total in the accumulator. For example, if digit 4 is in an order of the commutator, a circuit is made at the 4 cycle time as follows: Through the 4 spot of the emitter EM1, the 4 segment of the commutator order, its brushes 66, its common 68, a pair of contacts JTa, connected plug socket 239a, desired plug connection to a selected socket 240 (Fig. 20a) connected shutter magnet 438, and to line. This results in photographing of digit 4 on the film.

To expose the special total indicating spot 402c shown in Fig. 17 a circuit is completed at the "11" time in the cycle as follows: This circuit is completed from line 251 (Fig. 20), through emitter EM1, the "11" segment spot, one of the contacts JTa, plug socket 239c, through a plug wire to the left hand socket 240c of the 240 group, and energizes the shutter magnet 438c which effects exposing of the spot 402c on a line with the total. This spot is shown at 402c' on Fig. 22.

After the digit readout period of the reset cycle, contacts P12 open, and coil JT and magnet 180 are de-energized. The de-energization of 180 results in line spacing of the film following recording of the total. To distinctly mark the presence of a total a supplementary line spacing of the film is effected due to energization of coil 180 within the second half of the reset cycle. This occurs upon the closure of cam contacts P15 followed subsequently by de-energization of 180 when cam contacts P15 re-open. This provides a blank space on the film between the total and the first line of spots derived from the first card of the next card group. The blank space signifies that the preceding line bears a total. Spot recording of the group control number is effected in the following manner during the second half of the reset cycle. Due to a set up made during the last card feeding cycle upon relays such as GOu, GOt, etc. there is a representation of the group control number upon these relays. This set up is maintained due to relay contacts R43g remaining closed, as shown in Fig. 20a, when cam contacts L28 open after the control change in this cycle. Accordingly, upon closure of cam contacts P20 (Fig. 20a) a circuit is completed from line 251, as previously described, through cam contacts P20, selected contacts such as G0u2, G1u2 etc., selected relay contacts of the GS1—31 group, plug sockets 505 and via plug connection to sockets 240 and through the U1T1, etc. contacts to energize the selected recording magnets 438. Accordingly, recording of spots representative of the group control number is effected. It may be explained that the group number representation which is recorded after the recording of a total is the group number pertaining to the following group that is derived from the first card of the following group which was the last card sensed by the upper brushes before total taking and reset cycle. With respect to any given group by reference to Fig. 22, it will be noted that the group number representation, note the four black dots in the middle of the figure, precedes the listing of items in that group. In other words, for a given group, the group number representation precedes the group and the total indicating spot is at the end of the group. A circuit is also completed through the extreme right hand GS relay contact to the extreme right hand recording magnet for effecting recording of the master control spot designated 402b (Fig. 17) at this time. Following the recording operation a line spacing circuit for magnet 180 is completed as follows: from line 251, relay contacts RYd, contacts LCLu, cam contacts P21, magnet 180, cam contacts L25 and back to line 250. This provides movement of the film to a position for receiving the amount to be listed from the first card of the next group.

Last card conditions

As usual, in tabulating machines, special controls are provided for the operations pertaining to the last card of a run. Briefly, these may be summarized as follows: When the last card passes the upper brushes, relay UCL is de-energized. This does not occur until cam contacts F3 have opened and reclosed. Upon the next card feed cycle, when the last card passes the lower brushes, the relay R43 is de-energized upon the opening of cam contacts F2 and F3, the UCLb front contacts being opened and the LCLf contacts also being opened at this time.

Coil LCL ultimately de-energizes opening LCLa to interrupt the circuit of clutch magnet 117 and coil R1. The contacts R1a open, breaking the circuit of the motor M. The machine now stops and the last total has to be recorded during a hand-initiated reset cycle such as explained before. Coil R100 is still energized and contacts R100b are closed, so that the circuit of coil JT and magnet 180 is made and causes recording of a total and film feed in the manner previously stated. The supplementary film feed is also effected. After printing of the last total and resetting of the accumulators have occurred, contacts P11 open and de-energize coil R100. Coil RY is maintained energized slightly longer than R100 under control of contacts P17. Accordingly, when contacts R100e close, a circuit is provided as follows: from line 250, contacts RYb now closed, contacts R100e in the position shown, contacts LCLk and UCLk in the positions shown, through shutter trip magnet 180S and back to the other side of line 251. Energization of 180S will close the shutter in the camera unit. The spot recording for the next group is inoperative at this time due to contacts LCLt (Fig. 20a) which are now open and prevent any unwanted actuation of the shutter magnets 438. Likewise, the line space usually associated with spot recording is eliminated by the opening of contacts LCLu (Fig. 20).

Zero suppression circuits

It is frequently desirable in accounting procedure when amounts are being recorded to eliminate recording of zeros to the left of the highest order significant digit on the record.

Referring now to the lower part of Fig. 20a, each pair of contacts 512 pertaining to the various columnar orders is in series with one of the relay coils U, T, H, etc. These relay coils, when energized, open their associated contacts U1, T1, H1, etc.

Consider now a specific example. Assume amounts from a 5 column field are being listed under control of the 5 right hand recording magnets 438, and consider an amount such as 00305. Plug connections will be established from the lower brush plug sockets 237 (Fig. 20) connected to the brushes LB which analyze the five column field to plug sockets 238. Further plug connections are established from sockets 239 to sockets 240 (Fig. 20a) connected to the five right hand shutter magnets 438. The switch 510d is thrown to dotted line position as shown. At the fifth index point in the listing cycle a circuit will be completed from line 251, through card lever contacts 122, cam contacts L26 and F1, contact roll, through the five index point position of the units column of the card which is being analyzed, and through the lower brushes LB, plug socket 237, through the plug connection to plug socket 238, through relay contacts Ja now closed, through the plug connection from plug socket 239 to 240 (Fig. 20a), through contacts U1 to the units order recording magnet 438. This will effect recording of a 5 in the extreme right hand column and unlatch contacts 512u. In a similar manner recording of 3 in the hundreds column will effect opening of contacts 512h.

Referring now to the timing diagram (Fig. 21) it will be noted that the cam contacts L29 close shortly after the one index point. Closure of these contcts completes a circuit as follows: from line 250 through cam contacts L29, cam contacts P22, switch 510d, contacts 512tth and relay coil TTH, to line 251. Simultaneously, a branch circuit extends from switch 510d, through contacts 512tth, through switch 510e in the position shown, contacts 512th and relay coil TH. Since contacts 512h are open the circuit extends no further. Thus, at the zero cycle time when circuits are provided from the brushes in the tens, thousands and ten thousands orders of the assumed field, contacts TTH1 and TH1 are already open and no zeros are recorded in the thousands and ten thousands columns. Contacts T1, however, have remained closed and recording of a zero is effected in the tens column.

What is claimed is:

1. A photographing machine to photographically record character data and classifying codal data for the character data on a film and comprising movable carrier means bearing different characters disposed in the direction of travel of the carrier means and bearing code marks arranged in a row transverse to said direction and codally significant according to their transverse positions, selectively operable exposure devices to expose characters or code marks to the film to be photographed thereon, means to move the carrier means through cycles of travel in said direction to register the different characters with the exposure devices at different times of each said cycle of travel and to register the code marks concurrently at another, common time of such cycle with said exposure devices, means to select different characters at the different times of said cycle at which these characters register with the exposure devices, means controlled thereby to operate the exposure devices at the said different times as the selected characters register with the exposure devices so as to cause these characters to be exposed and photographed, means to select codal data to be photographed, and means controlled thereby for operating said exposure devices selectively at said common time of a said cycle so as to expose code marks, corresponding to the codal data, to the film to be photographed thereon.

2. A photographing machine to photograph character data and classifying codal data therefor on a film and comprising movable carrier means bearing different characters disposed in the direction of movement of the carrier and a row of code marks transverse to said direction and codally significant according to their transverse positions, individually operable exposure devices to expose characters or code marks from the carrier means to the film to be photographed thereon, means to move the carrier means through cycles of travel in said direction to register the different characters at differential times and the code marks at another, common time of each such cycle with the exposure devices, electrical means responsive to differentially timed electrical impulses for operating the exposure devices to expose the characters then registering therewith, codal data storing means responsive to differentially timed impulses corresponding to codal data designations for storing the codal data, and means subsequently controlled by the storing means and including means effective at said common time for operating the exposure devices selectively at said common time to expose those code marks corresponding to the stored codal data.

3. A photographing machine to photograph character data and classifying codal data therefor on a film, comprising movable carrier means bearing different characters disposed in the direction of movement of the carrier means and bearing code marks disposed in a row transverse to said direction and codally significant according to their transverse positions, electrically operable exposure devices to expose characters or code marks to the film to be photographed thereon, means to move the carrier means through cycles of travel in said direction to register the different characters at differential times and the code marks at another, common time of each such cycle with the exposure devices, circuits closed under control of differentially timed impulses for operating the exposure devices to expose the characters then registering with the exposure devices, storing relays to store codal data, circuits closed under control of the storing relays to operate the exposure devices selectively to expose a code mark or marks corresponding to the stored codal data, and contact means for timing the latter circuits to close at said common time.

JAMES W. BRYCE.